(12) United States Patent
Guo et al.

(10) Patent No.: US 11,431,465 B2
(45) Date of Patent: Aug. 30, 2022

(54) CONTROL INFORMATION SENDING METHOD AND RECEIVING METHOD, BASE STATION, AND TERMINAL

(71) Applicant: CHINA ACADEMY OF TELECOMMUNICATIONS TECHNOLOGY, Beijing (CN)

(72) Inventors: Baojuan Guo, Beijing (CN); Xin Su, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 222 days.

(21) Appl. No.: 16/637,957

(22) PCT Filed: Aug. 8, 2018

(86) PCT No.: PCT/CN2018/099319
§ 371 (c)(1),
(2) Date: Feb. 10, 2020

(87) PCT Pub. No.: WO2019/029553
PCT Pub. Date: Feb. 14, 2019

(65) Prior Publication Data
US 2020/0213070 A1 Jul. 2, 2020

(30) Foreign Application Priority Data
Aug. 11, 2017 (CN) .......................... 201710687840.3

(51) Int. Cl.
*H04L 5/10* (2006.01)
*H04L 5/00* (2006.01)
*H04W 72/04* (2009.01)

(52) U.S. Cl.
CPC .............. *H04L 5/10* (2013.01); *H04L 5/0007* (2013.01); *H04L 5/0055* (2013.01); *H04W 72/042* (2013.01)

(58) Field of Classification Search
CPC ....... H04L 5/10; H04L 5/0007; H04L 5/0055; H04L 5/0094; H04L 5/0023; H04L 5/0048; H04L 5/0053; H04W 72/042
See application file for complete search history.

(56) References Cited

U.S. PATENT DOCUMENTS 9,716,576 B2 * 7/2017 Chun ..................... H04L 5/0023
11,088,904 B2 * 8/2021 Gao ..................... H04W 72/042
(Continued)

FOREIGN PATENT DOCUMENTS

| CN | 103259635 A | 8/2013 |
|---|---|---|
| CN | 103299556 A | 9/2013 |

(Continued)

OTHER PUBLICATIONS

Extended European Search Report dated Jun. 16, 2020 for Application No. EP 18 84 3014.
(Continued)

*Primary Examiner* — Hoang-Chuong Q Vu
(74) *Attorney, Agent, or Firm* — Harness, Dickey & Pierce, P.L.C.

(57) ABSTRACT

A method of sending control information, a method of receiving control information, a base station, and a terminal are provided. The method of sending control information is applied to a base station and includes: acquiring an index, in a preset DMRS configuration table, of DMRS configuration information of a PDSCH; and sending the index to a terminal through downlink control information.

19 Claims, 6 Drawing Sheets

Acquiring an index, in a preset DMRS configuration table, of DMRS configuration information of a PDSCH — 51

Sending the index to the terminal through downlink control information — 52

(56) References Cited

U.S. PATENT DOCUMENTS

| | | | |
|---|---|---|---|
| 11,190,328 B2* | 11/2021 | Gao | H04L 5/0051 |
| 2011/0103324 A1* | 5/2011 | Nam | H04L 5/0091 |
| | | | 370/329 |
| 2012/0176884 A1* | 7/2012 | Zhang | H04W 72/042 |
| | | | 370/203 |
| 2013/0022087 A1* | 1/2013 | Chen | H04J 13/0074 |
| | | | 375/147 |
| 2014/0112287 A1* | 4/2014 | Chun | H04L 5/0048 |
| | | | 370/329 |
| 2014/0293881 A1* | 10/2014 | Khoshnevis | H04L 5/0046 |
| | | | 370/329 |
| 2015/0003352 A1* | 1/2015 | Seo | H04B 7/08 |
| | | | 370/329 |
| 2015/0334683 A1 | 11/2015 | Guo et al. | |
| 2017/0086153 A1* | 3/2017 | Yoon | H04W 56/001 |
| 2017/0093538 A1* | 3/2017 | Yoon | H04L 5/0048 |
| 2018/0278391 A1 | 9/2018 | Zhang et al. | |
| 2020/0204335 A1* | 6/2020 | Kim | H04L 27/2646 |
| 2020/0259609 A1* | 8/2020 | Saito | H04L 5/0048 |
| 2020/0296747 A1* | 9/2020 | Kim | H04W 72/1273 |

FOREIGN PATENT DOCUMENTS

| | | |
|---|---|---|
| CN | 103795513 A | 5/2014 |
| WO | WO-2017/050153 A1 | 3/2017 |

OTHER PUBLICATIONS

Catt, "On DMRS design for DL," 3GPP TSG RAN WG1 Meeting #90, R1-1712383, Aug. 21-25, 2017, Prague, Czechia.

Nokia, "BPL definition and Spatial QCL time indication," 3GPP TSG RAN WG1#89, R1-1708906, Sep. 15-19, 2017, Hangzhou, P.R. China.

International Preliminary Report on Patentability dated Feb. 20, 2020 for International Application No. PCT/CN2018/099319.

Written Opinion of the International Searching Authority dated Oct. 26, 2018 for International Application No. PCT/CN2018/099319.

European Patent office Communication dated Feb. 17, 2021 for EP Application No. 18843014.4.

Interdigital Inc., "DCI Design for Multi-TRP/Panel Transmission for DL", 3GPP TSG RAN WG1 Meeting NRAH2, R1-1710923, Qingdao, China, Jun. 27-30, 2017.

* cited by examiner

DM-RS RE of antenna port 0/1/6/7

DM-RS RE of antenna port 2/3/8/9

DM-RS RE of antenna port 4/5/10/11

CONTROL INFORMATION SENDING METHOD AND RECEIVING METHOD, BASE STATION, AND TERMINAL

CROSS-REFERENCE TO RELATED APPLICATIONS

This application is a U.S. national phase application of a PCT Application No. PCT/CN2018/099319 filed on Aug. 8, 2018, which claims a priority to a Chinese Patent Application No. 201710687840.3 filed in China on Aug. 11, 2017, the disclosure of which is incorporated in its entirety by reference herein.

TECHNICAL FIELD

The present disclosure relates to the field of communication technology, and in particular, relates to a method of sending control information, a method of receiving control information, a base station, and a terminal.

BACKGROUND

After a Fifth Generation (5G) New Radio (NR) project was started, a pilot pattern of a Demodulation Reference Signal (DMRS) is redesigned and redefined, in order to reduce a processing delay and improve system performance. Referring to FIG. 1 to FIG. 4, there are multiple different pilot patterns of the DMRS that are newly defined. A specific configuration is as follows:

Configuration 1:

1. The number of DMRS symbols is 1: using comb2 +CS2, and a maximum of 4 ports are supported.

Referring to FIG. 1, the maximum of 4 antenna ports are supported in FIG. 1; the comb2 is frequency-domain multiplexing. For example, a multiplexing relationship of the comb2 exists between a port 0 and a port 2. The CS2 is that sequences between ports are multiplexed by using a Cyclic Shift (CS). For example, a multiplexing relationship of CS2 exists between the port 0 and the port 1.

2. The number of DMRS symbols is 2: using comb2+ CS2+TD-OCC {(1, 1)) and (1, −1)}, and a maximum of 8 ports are supported.

Referring to FIG. 2, the maximum of 8 antenna ports are supported in FIG. 2. The TD-OCC is a time-domain orthogonal code (OCC) multiplexing, such as the time-domain OCC multiplexing exists between ports 0/1 and ports 4/5. .

Configuration 2:

1. The number of DMRS symbols is 1: 2-FD-OCC { frequency-domain Orthogonal Codes of adjacent Resource Elements (RE)} is adopted, and the maximum of 6 ports are supported.

Referring to FIG. 3, the maximum of 6 antenna ports are supported in FIG. 3; wherein, 2-FD-OCC is the frequency-domain OCC multiplexing. For example, the frequency-domain OCC multiplexing exists between a port 0 and a port 1.

In addition, other ports are multiplexed in a Frequency-Division Multiplexing (FDM) manner, for example, the FDM is used between the ports 0/1 and the ports 2/3.

2. The number of DMRS symbols is 2: 2-FD-OCC (adjacent Frequency-Domain RE)+TD-OCC ({1 1} and {1 −1 }), and a maximum of 12 ports are supported.

Referring to FIG. 4, a maximum of 12 antenna ports are supported in FIG. 4; TD-OCC is the time-domain OCC multiplexing, for example, the time-domain OCC multiplexing exists between ports 0/1 and ports 6/7.

It may be seen from the above various DMRS modes that: in the case of the configuration 1, if the maximum number of supported ports does not exceed 4, the mode in FIG. 1 may be used; if the maximum number of supported ports exceeds 4, but does not exceed 8, then the mode in FIG. 2 may be used; and in the case of configuration 2, if the maximum number of supported ports does not exceed 6, the mode in FIG. 3 may be used; If the maximum number of supported ports exceeds 6, but does not exceed 12, then the mode in FIG. 4 may be used. The number of ports here refers to a sum of the number of ports of all users multiplexed at a resource location.

In the 5G NR system, in order to increase a peak rate of a User Equipment (UE), multiple Transmission Reception Points (TRPs) can be used, and each UE can simultaneously transmit a Physical Downlink Shared Channel (PDSCH) multiple TRPs; multiple TRPs can send a PDSCH simultaneously, or each TRP can send a PDSCH independently. However, if multiple TRPs send a PDSCH simultaneously, then how to indicate DMRS configuration information of the PDSCH through DCI information is still not solved in the related art.

SUMMARY

The present disclosure provides a method of sending control information, a method of receiving control information, a base station, and a terminal, so as to solve a problem of how to indicate DMRS configuration information of a PDSCH through DCI information in a case that multiple TRPs simultaneously transmit the PDSCH.

In a first aspect, some embodiments of the present disclosure provide method of sending control information. The method is applied to a base station and includes: acquiring an index, in a preset Demodulation Reference Signal (DMRS) configuration table, of DMRS configuration information of a Physical Downlink Shared Channel (PDSCH); and sending the index to a terminal through downlink control information.

In the above solution, acquiring the index, in the preset DMRS configuration table, of the DMRS configuration information of the PDSCH, includes: acquiring, from the preset DMRS configuration table, an index corresponding to configuration information that meets a configuration condition of the terminal, wherein the configuration information includes the total number of ports and total port numbers and the configuration condition includes the number of Transmission Reception Points (TRP) currently supported by the terminal and the number of ports supported by each TRP.

In the above solution, acquiring, from the preset DMRS configuration table, the index corresponding to configuration information that meets the configuration condition of the terminal, includes: acquiring, from the preset DMRS configuration table, an index corresponding to configuration information that matches each TRP in single-point transmission currently supported by the terminal; wherein the total number of ports included in each piece of configuration information does not exceed the number of ports supported by the TRP corresponding to the configuration information.

In the above solution, sending the index to the terminal through the downlink control information, includes: sending, to the terminal through the downlink control information, an index corresponding to configuration information corresponding to each TRP currently supported by the terminal.

In the above solution, acquiring, from the preset DMRS configuration table, the index corresponding to configuration information that meets the configuration condition of the terminal, includes: acquiring, from the preset DMRS configuration table, an index corresponding to configuration information in which the number of TRPs included in multi-point transmission matches the number of TRPs for the terminal, and the total number of ports does not exceed the total number of ports supported by the terminal.

In the above solution, the DMRS configuration table further includes a port number and the number of ports allocated for each TRP; wherein any two port numbers among port numbers of different TRPs are non-code-division multiplexed and non-time-domain orthogonal cover codes.

In the above solution, sending the index to the terminal through the downlink control information includes: sending the index and indication information to the terminal through the downlink control information, wherein the indication information is configured to indicate a TRP type of a TRP corresponding to the index, and the TRP type is single-point transmission or multi-point transmission.

In the above solution, the index includes a first-level index and a second-level index corresponding to the first-level index; the first-level index is an index associated with the total number of ports in the DMRS configuration table; the second-level index is an index associated with a port number in the DMRS configuration table.

In the above solution, sending the index to the terminal through the downlink control information includes: encapsulating the index in a preset field of the downlink control information, and sending the index to the terminal through the downlink control information; or adding a preset field for the index in the downlink control information, and sending the index to the terminal through the downlink control information.

In the above solution, sending the index to the terminal through the downlink control information, includes: encapsulating, in a preset field of the downlink control information, the index in a preset character format, and sending the index to the terminal through the downlink control information.

In a second aspect, some embodiments of the present disclosure further provide a method of receiving control information. The method is applied to a terminal and includes: acquiring an index, carried in downlink control information, of Demodulation Reference Signal (DMRS) configuration information for a physical downlink shared channel in a preset DMRS configuration table; and searching configuration information, indicated by the index, in the DMRS configuration table.

In the above solution, searching configuration information, indicated by the index, in the DMRS configuration table includes: determining a Transmission Reception Point (TRP) type of a TRP corresponding to the index, wherein the TRP type includes single-point transmission and multi-point transmission; and searching, in the preset DMRS configuration table, configuration information indicated by the index under the TRP type of the TRP corresponding to the index.

In the above solution, searching, in the preset DMRS configuration table, the configuration information indicated by the index under the TRP type of the TRP corresponding to the index includes: in a case that the TRP type of the index is the single-point transmission, searching, in the preset DMRS configuration table, the number of ports and port numbers corresponding to the TRP of the single-point transmission indicated by the index under the type of the single-point transmission.

In the above solution, searching, in the preset DMRS configuration table, the configuration information indicated by the index under the TRP type of the TRP corresponding to the index includes: in a case that the TRP type is the multi-point transmission, searching, in the preset DMRS configuration table, the number of TRPs of the multi-point transmission indicated by the index and the number of ports supported by each TRP under the type of the multi-point transmission.

In the above solution, determining a TRP type of a TRP corresponding to the index, includes: determining the TRP type of the TRP corresponding to the index based on indication information carried in the downlink control information and used for indicating the TRP type of the TRP corresponding to the index; or determining the TRP type of the TRP corresponding to the index based on Quasi Co-Location information carried in the downlink control information.

In the above solution, the DMRS configuration table further includes port numbers and the number of ports allocated for each TRP; wherein any two of the port numbers of different TRPs are non-code-division multiplexed and non-time domain orthogonal cover codes.

In the above solution, the index includes a first-level index and a second-level index corresponding to the first-level index; the first-level index is an index associated with the total number of ports in the DMRS configuration table; the second-level index is an index associated with port numbers in the DMRS configuration table.

In the above solution, searching the configuration information, indicated by the index, in the DMRS configuration table includes: searching the second-level index corresponding to the first-level index in the DMRS configuration table, and searching configuration information indicated by the second-level index in the DMRS configuration table.

In the above solution, acquiring the index, carried in the downlink control information, of DMRS configuration information for the physical downlink shared channel in the preset DMRS configuration table includes: acquiring, from a preset field in the downlink control information, the index of the DMRS configuration information for the physical downlink shared channel in the preset DMRS configuration table; or acquiring bytes added with a preset field in the downlink control information, wherein the bytes added with the preset field are the index of the DMRS configuration information for the physical downlink shared channel in the preset DMRS configuration table.

In the above solution, acquiring the index, carried in the downlink control information, of the DMRS configuration information for the physical downlink shared channel in the preset DMRS configuration table includes: acquiring a field having a preset character format from a preset field in the downlink control information, wherein the field having the preset character format is the index of the DMRS configuration information for the physical downlink shared channel in the preset DMRS configuration table.

In a third aspect, some embodiments of the present disclosure further provide a base station. The base station includes an index acquisition module, configured to acquire an index, in a preset Demodulation Reference Signal (DMRS) configuration table, of DMRS configuration information of a physical downlink shared channel; and an index sending module, configured to send the index to a terminal through downlink control information.

In the above solution, the index acquisition module includes: an acquisition sub-module, configured to acquire, from the preset DMRS configuration table, an index corresponding to configuration information that meets a configuration condition of the terminal, wherein the configuration information includes the total number of ports and total port numbers, and the configuration condition includes the number of Transmission Reception Points (TRPs) currently supported by the terminal and the number of ports supported by each TRP.

In the above solution, the acquisition sub-module includes: a single transmission-reception-point acquisition unit, configured to acquire, from the preset DMRS configuration table, an index corresponding to configuration information that matches each TRP in single-point transmission currently supported by the terminal; wherein the total number of ports included in each piece of configuration information does not exceed the number of ports supported by the TRP corresponding to the configuration information.

In the above solution, the index sending module includes a first sending sub-module, configured to send, to the terminal through the downlink control information, an index corresponding to configuration information corresponding to each TRP currently supported by the terminal.

In the above solution, the acquisition sub-module includes a multi-transmission-reception-point acquisition unit, configured to acquire, from the preset DMRS configuration table, an index corresponding to configuration information in which the number of TRPs included in multi-point transmission matches the number of TRPs for the terminal, and the total number of ports does not exceed the total number of ports supported by the terminal.

In the above solution, the DMRS configuration table further includes a port number and the number of ports allocated for each TRP; wherein any two port numbers among port numbers of different TRPs are non-code-division multiplexed and non-time-domain orthogonal cover codes.

In the above solution, the index sending module includes a second sending sub-module, configured to send the index and indication information to the terminal through downlink control information, wherein the indication information is configured to indicate a Transmission Reception Point (TRP) type of a TRP corresponding to the index, and the TRP type is single-point transmission or multi-point transmission.

In the above solution, the index includes a first-level index and a second-level index corresponding to the first-level index; the first-level index is an index associated with the total number of ports in the DMRS configuration table; the second-level index is an index associated with a port number in the DMRS configuration table.

In the above solution, the index sending module includes a third sending sub-module, configured to encapsulate the index in a preset field of the downlink control information, and send the index to the terminal through the downlink control information; or add a preset field for the index in the downlink control information, and send the index to the terminal through the downlink control information.

In the above solution, the index sending module includes a fourth sending sub-module, configured to encapsulate, in a preset field of the downlink control information, the index in a preset character format, and send the index to the terminal through downlink control information.

In a fourth aspect, some embodiments of the present disclosure further provide a terminal. The terminal includes an acquisition module, configured to acquire an index, carried in downlink control information, of Demodulation Reference Signal (DMRS) configuration information for a physical downlink shared channel in a preset DMRS configuration table; and a search module, configured to search configuration information, indicated by the index, in the DMRS configuration table.

In the above solution, the search module includes: a type determination sub-module, configured to determine a Transmission Reception Point (TRP) type of a TRP corresponding to the index, wherein the TRP type includes single-point transmission and multi-point transmission; and an information search sub-module, configured to search, in the preset DMRS configuration table, configuration information indicated by the index under the TRP type of the TRP corresponding to the index.

In the above solution, the information search sub-module includes: a single transmission-reception-point search unit, configured to: in a case that the TRP type of the index is the single-point transmission, search, in the preset DMRS configuration table, the number of ports and port numbers corresponding to the TRP of the single-point transmission indicated by the index under the type of the single-point transmission.

In the above solution, the information search sub-module includes: a multi-transmission-reception-point search unit, configured to: in a case that the TRP type is the multi-point transmission, search, in the preset DMRS configuration table, the number of TRPs of the multi-point transmission indicated by the index and the number of ports supported by each TRP under the type of the multi-point transmission.

In the above solution, the type determination sub-module includes: a first determination unit, configured to determine a TRP type of a TRP corresponding to the index based on indication information carried in the downlink control information and used for indicating the TRP type of the TRP corresponding to the index; or a second determination unit, configured to determine the TRP type of the TRP corresponding to the index based on Quasi Co-Location information carried in the downlink control information.

In the above solution, the DMRS configuration table further includes port numbers and the number of ports allocated for each TRP; wherein any two of the port numbers of different TRPs are non-code-division multiplexed and non-time domain orthogonal cover codes.

In the above solution, the index includes a first-level index and a second-level index corresponding to the first-level index; the first-level index is an index associated with the total number of ports in the DMRS configuration table; the second-level index is an index associated with port numbers in the DMRS configuration table.

In the above solution, the search module includes: an index search sub-module, configured to search the second-level index corresponding to the first-level index in the DMRS configuration table, and search configuration information indicated by the second-level index in the DMRS configuration table.

In the above solution, the acquisition module includes: a first acquisition sub-module, configured to acquire, from a preset field in the downlink control information, the index of the DMRS configuration information for the physical downlink shared channel in the preset DMRS configuration table; or a second acquisition module, configured to acquire bytes added with a preset field in the downlink control information, wherein the bytes added with the preset field are the index of the DMRS configuration information for the physical downlink shared channel in the preset DMRS configuration table.

In the above solution, the acquisition module includes: a third acquisition sub-module, configured to acquire a field having a preset character format from a preset field in the downlink control information, wherein the field having the preset character format is the index of the DMRS configuration information for the physical downlink shared channel in the preset DMRS configuration table.

In a fifth aspect, some embodiments of the present disclosure further provide a base station. The base station includes a first storage, a first processor, and a computer program stored on the first storage and executable by the first processor; wherein when the first processor executes the program, the first processor implements following steps: acquiring an index, in a preset Demodulation Reference Signal (DMRS) configuration table, of DMRS configuration information of a Physical Downlink Shared Channel (PDSCH); and sending the index to a terminal through downlink control information.

In a sixth aspect, some embodiments of the present disclosure further provide a computer readable storage medium. The computer readable storage medium includes a computer program stored on the computer readable storage medium, wherein when the program is executed by a processor, the processor implements following steps: acquiring an index, in a preset Demodulation Reference Signal (DMRS) configuration table, of DMRS configuration information of a Physical Downlink Shared Channel (PDSCH); and sending the index to a terminal through downlink control information.

In a seventh aspect, some embodiments of the present disclosure further provide a terminal. The terminal includes a second storage, a second processor, and a computer program stored on the second storage and executable by the second processor; wherein when the second processor executes the program, the second processor implements following steps: acquiring an index, carried in downlink control information, of Demodulation Reference Signal (DMRS) configuration information for a physical downlink shared channel in a preset DMRS configuration table; and searching configuration information, indicated by the index, in the DMRS configuration table.

In an eighth aspect, some embodiments of the present disclosure further provide a computer readable storage medium. The medium includes a computer program stored on the computer readable storage medium, wherein when the program is executed by a processor, the processor implements following steps: acquiring an index, carried in downlink control information, of Demodulation Reference Signal (DMRS) configuration information for a physical downlink shared channel in a preset DMRS configuration table; and searching configuration information, indicated by the index, in the DMRS configuration table.

Beneficial effects of the above technical solutions of the present disclosure are as follows: in the above solutions, by configuring the index for DMRS configuration information of a TRP of multi-point transmission and sending the index to a terminal through the downlink control information, the DCI information may indicate DMRS configuration information of the PDSCH, and enable the terminal to query corresponding configuration information in a DMRS configuration table according to the index, so as to realize transmission of a Physical Downlink Shared Channel by a plurality of TRPs and save a signaling overhead by way of the index. The present disclosure addresses a problem of how to indicate DMRS configuration information of a PDSCH through the DCI information in a case that multiple TRPs simultaneously transmit the PDSCH.

DETAILED DESCRIPTION

In order to make technical problems, technical solutions, and advantages of the present disclosure clearer, detailed description is given hereinafter with reference to accompanying drawings and specific embodiments. In the following description, specific details such as specific configurations and components are provided only to assist in comprehensive understanding of some embodiments of the present disclosure. Therefore, it should be apparent to those skilled in the art that various changes and modifications can be made to the embodiments described herein without departing from the scope and the spirit of the present disclosure. In addition, descriptions of known functions and constructions are omitted for clarity and conciseness.

It should be understood that "an embodiment" or "one embodiment" mentioned throughout the specification means that a particular feature, structure, or characteristic related to the embodiment is included in at least one embodiment of the present disclosure. Thus, "in one embodiment" or "in an embodiment" appearing throughout the specification are not necessarily referring to the same embodiment. Furthermore, the particular feature, structure, or characteristic may be combined in any suitable manner in one or more embodiments.

In various embodiments of the present disclosure, it should be understood that sequence numbers of the following processes do not mean an execution order. The execution order of the processes should be determined by functions and internal logic thereof. Implementation of some embodiments of the present disclosure should not be limited thereto.

In addition, terms such as "system" and "network" are often used interchangeably herein.

In the embodiments provided in the present disclosure, it should be understood that "B corresponding to A" means that B is associated with A, and B can be determined according to A. However, it should also be understood that determining B according to A does not mean that B is determined only based on A, and B may also be determined based on A and/or other information.

Specifically, the present disclosure provides a method of sending control information, a method of receiving control information, a base station, and a terminal, so as to solve a problem that how DMRS configuration information of a PDSCH through DCI information may be indicated in a case that multiple Transmission/Reception Points (TRPs) transmit the PDSCH simultaneously.

Figure 5:
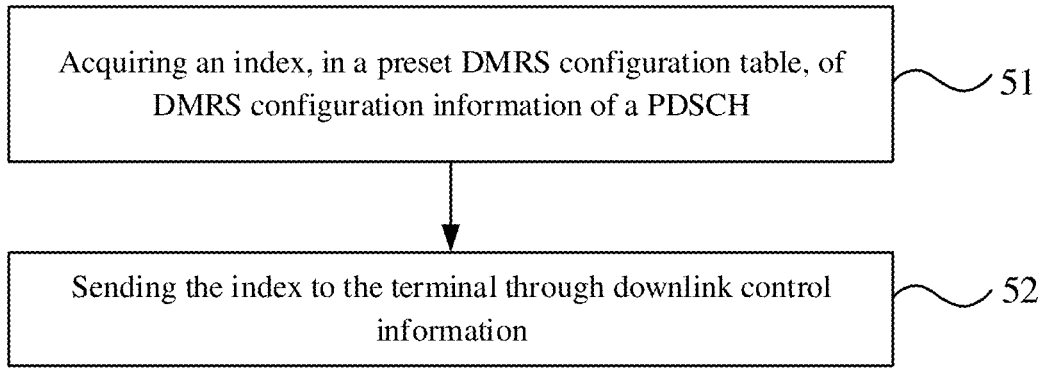
FIG. 5 is a flowchart of a method of sending control information at a base-station side according to some embodiments of the present disclosure.

As shown in FIG. 5, some embodiments of the present disclosure provide a method of sending control information. The method of sending control information is applied to a base station. The method includes steps 51-52.

Step 51: acquiring an index, in a preset DMRS configuration table, of Demodulation Reference Signal (DMRS) configuration information of a Physical Downlink Shared Channel (PDSCH).

The Physical Downlink Shared Channel (DSCH) is used to carry downlink service data, paging messages, and so on. In a case where multiple TRPs are used to send a PDSCH, different ports of the PDSCH can be sent at each TRP, and the terminal finally performs a uniform demodulation as a scheduling. Therefore, it is necessary to notify the terminal of an overall port allocation status of the multiple TRPs through the DMRS configuration information, as well as which ports are allocated to each TRP, and indicate the DMRS configuration information of the PDSCH through Downlink Control Information (DCI).

In the embodiments of the present disclosure, there are multiple pieces of configuration information in a preset DMRS configuration table, and the configuration information includes the number of ports and port numbers allocated to the TRPs; and in the DMRS configuration table, an index used to associate each piece of configuration information, that is, the index corresponding to each piece of configuration information in a one-to-one manner, also exits in the configuration information. In this way, when a base station transmits the DCI, the index included in the DMRS configuration information can be sent to the terminal to save byte overhead.

Step 51 includes: acquiring, from the preset DMRS configuration table, an index corresponding to configuration information that meets a configuration condition of the terminal, wherein the configuration information includes the total number of ports and total port numbers and the configuration condition includes the number of TRPs currently supported by the terminal and the number of ports supported by each TRP.

In a process of configuring the DMRS for the terminal by the base station, the base station knows (or acquires) the number of TRPs currently supported by the terminal and the number of ports supported by each TRP to determine the configuration condition of the terminal; and then acquires, from the DMRS configuration table, the index corresponding to the configuration information that meets the configuration condition of the terminal.

Step 52: sending the index to the terminal through downlink control information.

After the index is determined, the index is carried in the downlink control information, and the index is sent to the terminal through the downlink control information.

Specifically, in the foregoing solution, acquiring, from the preset DMRS configuration table, the index corresponding to the configuration information that meets the configuration condition of the terminal may be performed in the following two ways:

First way: each of the multiple TRPs is considered as a single TRP. Optionally, the step 51 includes: acquiring, from the preset DMRS configuration table, an index corresponding to configuration information that matches each TRP in single-point transmission currently supported by the terminal; wherein the total number of ports included in each piece of configuration information does not exceed the number of ports supported by the TRP corresponding to the configuration information.

Each of N TRPs is regarded as a single TRP, and is configured according to DMRS configuration information of the single TRP; configuration information of the type of the single TRP and the index corresponding to the configuration information that matches the TRP currently supported by the terminal are acquired from the preset DMRS configuration table. For example, if the terminal supports two TRPs, indexes of configuration information that match the two TRPs respectively are acquired from the DMRS configuration table; and the total number of ports included in the configuration information matching a determined TRP does not exceed the number of ports supported by the TRP.

As a first example, referring to Table, Table 1 shows a condition of configuration information configurable in a single-point transmission:

TABLE 1

| Index of a single TRP | The number of ports | port number | An identifier corresponding to a pilot pattern |
|---|---|---|---|
| 0 | 1 | port0 | 1 |
| 1 | 1 | port1 | 1 |
| 2 | 1 | port2 | 1 |
| 3 | 1 | port3 | 1 |
| 4 | 1 | port4 | 2 |
| 5 | 1 | port5 | 2 |
| 6 | 1 | port6 | 2 |
| 7 | 1 | port7 | 2 |
| 8 | 2 | port0/1 | 1 |
| 9 | 2 | port2/3 | 1 |
| 12 | 2 | port4/5 | 2 |
| 13 | 2 | port6/7 | 2 |
| 14 | 3 | port0-2 | 1 |
| 15 | 3 | port1-3 | 1 |
| 16 | 3 | port0-1, 4 | 2 |
| 17 | 3 | port2-3, 6 | 2 |
| 18 | 4 | port0-3 | 1 |
| 19 | 4 | port0-1, 4-5 | 2 |
| 20 | 4 | port2-3, 6-7 | 2 |
| 21 | 5 | port0-4 | 2 |
| 22 | 6 | port0-4, 6 | 2 |
| 23 | 7 | port0-6 | 2 |
| 24 | 8 | port0-7 | 2 |

It should be noted that if, for the configuration information included in the above Table 1, the number of ports allocated to a user exceeds the number of ports in a Code Division Multiplexing (CDM) group or a CDM+time-domain orthogonal code (TD-OCC) group corresponding to the configuration information, then for a Single-User Multiple-Input Multiple-Output (SU-MIMO) user, the number of ports should be ensured to be uniform among groups to the best of a system's ability, so as to ensure that each port is allocated with more power and improve pilot performance.

For a Multi-User Multiple-Input Multiple-Output (MU-MIMO) user or a SU-MIMO user whose number of ports does not exceed the number of ports in a CDM group or a CDM+TD-OCC group, ports in one CDM group or CDM+TD-OCC group are ensured to be allocated to the user to the best of the system's ability and accordingly pilot resources for the user are saved and interference among users is reduced.

Figure 1:
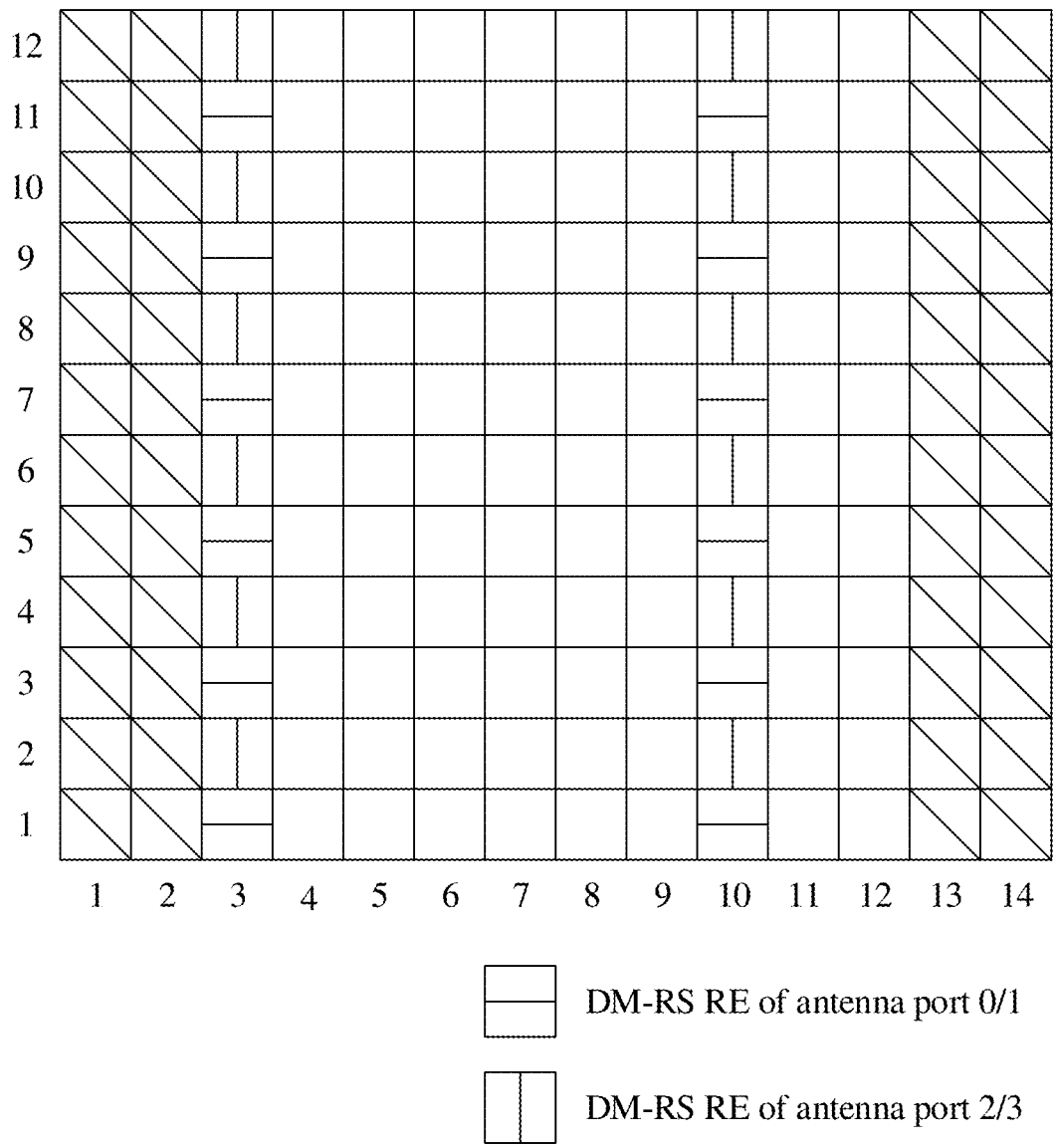
FIG. 1 is a first configuration mode of a demodulation reference signal in the related art.
Figure 2:
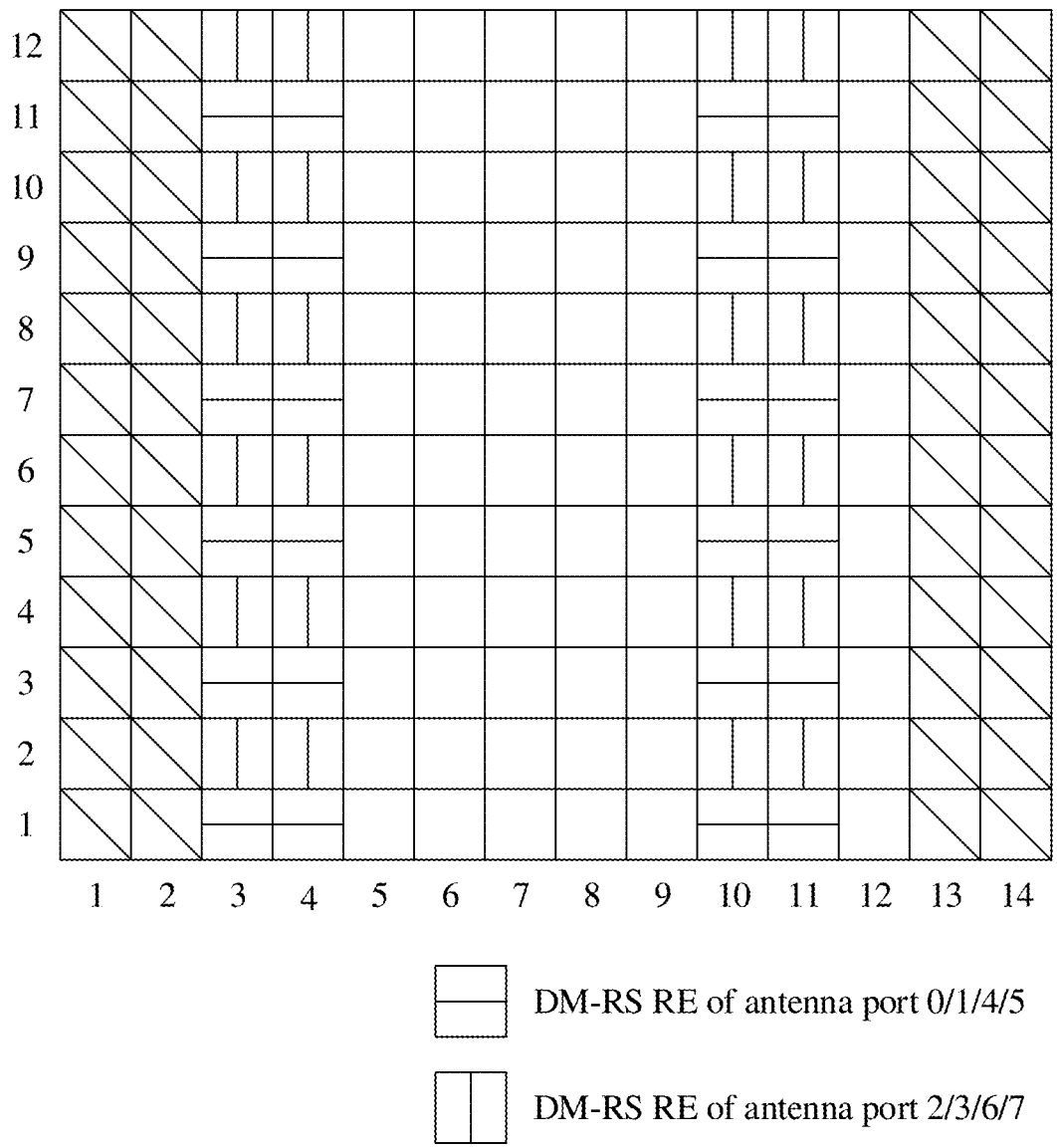
FIG. 2 is a second configuration mode of a demodulation reference signal in the related art.

Specifically, in the above Table 1, a first column from the left is the index corresponding to a single TRP, second to third columns are configuration information, and a fourth column is the identifier of the pilot pattern in the Background corresponding to the configuration information, wherein an identifier 1 corresponds to the pilot pattern in FIG. 1, and the identifier 2 corresponds to the pilot pattern in the FIG. 2, wherein 'port' represents the port number; for a TRP using a single-point transmission, such as the index is 18, then the total number of ports is 4 and the port numbers are 0 to 3; for example, when the index is 13, the total number of ports is 2 and the port numbers are 6 and 7.

In the above solution, the step of sending the index to the terminal through downlink control information includes: sending, to the terminal through the downlink control information, an index corresponding to configuration information corresponding to each TRP currently supported by the terminal.

In this step, if the terminal supports N TRPs, the index of each TRP needs to be sent to the terminal. It is assumed that DMRS configuration information of a single TRP is represented by M1 bits, and M1=5 bits in Table 1, then a total signaling overhead of DMRS configuration information for the N TRPs is N*M1 bits. Port conditions of the N TRPs are respectively acquired without an additional notification.

Second way: multiple TRPs use a unified DMRS configuration signaling, to jointly configure DMRS configuration port information for the UE on all TRPs. Optionally, the Step 51 includes: acquiring, from the preset DMRS configuration table, an index corresponding to configuration information in which the number of TRPs included in a multi-point transmission matches the number of TRPs for the terminal, and the total number of ports does not exceed the total number of ports supported by the terminal.

In this step, in a process of matching configuration information for a multi-point transmission, the configuration information needs to satisfy that the number of TRPs included in the multi-point transmission matches the number of TRPs for the terminal, and the total number of ports does not exceed the total number of ports supported by the terminal. That is, the number of TRPs of the multi-point transmission included in the configuration information is the same as the number of TRPs of the multi-point transmission supported by the terminal, and the total number of ports included in the configuration information does not exceed the number of ports supported by the terminal.

As a second example, referring to Table 2, Table 2 illustrates a condition of configuration information configurable in a multi-point transmission:

TABLE 2

| Multi-TRP index | Single-TRP index | Number of ports | Port number |
|---|---|---|---|
| / | 0 | 1 | port0 |
| / | 1 | 1 | port1 |
| / | 2 | 1 | port2 |
| / | 3 | 1 | port3 |
| / | 4 | 1 | port4 |
| / | 5 | 1 | port5 |
| / | 6 | 1 | port6 |
| / | 7 | 1 | port7 |
| / | 8 | 2 | port0/1 |
| / | 9 | 2 | port2/3 |
| / | 10 | 2 | port4/5 |
| / | 11 | 2 | port6/7 |
| 0 | 12 | 2 | port0/2 |
| 1 | 13 | 2 | port1/3 |
| 2 | 14 | 2 | port4/6 |
| 3 | 15 | 2 | port5/7 |
| 4 | 16 | 3 | port0-2 |
| 5 | 17 | 3 | port1-3 |
| 6 | 18 | 3 | port4-6 |
| 7 | 19 | 3 | port5-7 |
| 8 | 20 | 4 | port0-3 |
| / | 21 | 4 | port4-7 |
| 9 | 22 | 5 | port0-4 |
| 10 | 23 | 6 | port0-5 |
| 11 | 24 | 7 | port0-6 |
| 12 | 25 | 8 | port0-7 |
| 13 | / | 4 | port0-2, 4 |
| 14 | / | 5 | port0-2, 4-5 |
| 15 | / | 6 | port0-4, 6 |

In Table 2 above, the N TRPs use a unified signaling for notifying a DMRS configuration, to jointly configure information of DMRS configuration ports of the UE on all TRPs. A DMRS configuration table in Table 2 can take a form of a unified Table for multiple TRPs (multi-TRP) and a single TRP (single-TRP). A first column (from the left) is a multi-TRP index, and a second column is a single-TRP index. According to a Quasi Co-Location (QCL) of multiple TRPs carried in the DCI, whether a current scheduling to the UE is from a single TRP or multiple TRPs may be known, and the index of the DMRS configuration can be resolved at the same time, wherein the QCL information can be QCL information of DMRS and CSIRS or other information that can identify the multi-TRP and the single-TRP.

Assuming that the index is X, then the total number of ports and port number information are determined through Table 2. If a current schedule is related to the single-TRP, information is read from the Table according to the index on the second column; if the current schedule is related to the multi-TRP, information is read from the Table according to the index on the first column.

In case of a single-TRP index, if the current schedule is confirmed to be the multi-TRP, the DMRS configuration index+a difference value will be acquired, and then the total number of ports and port information in the Table will be read according to multi-TRP indexes. The difference value can be determined according to relationship between the multi-TRP indexes and the single-TRP index in the Table.

For example, if X is 5, and a manner in which a current subframe schedules a user is the multi-TRP, then the read DMRS configuration information is: 3, port 1-3. If the manner in which the current subframe schedules a user is the single-TRP, then the read DMRS configuration information is: 1, port 5.

Further, in the above solution, the DMRS configuration table further includes: a port number and the number of ports allocated for each TRP; wherein any two port numbers among port numbers of different TRPs are non-code-division multiplexed and non-time-domain orthogonal cover codes.

In this step, for the multi-TRP mode, the port number and the number of ports assigned to each TRP can also be given, and which ports and port numbers of the ports are assigned to each TRP are also given, that is, the DMRS port group of each TRP is given. All possible combinations of ports for each TRP are given by providing separately the DMRS port group assigned to each TRP, and the corresponding index is notified to the terminal. For example, in the Table 2 above, assuming the multi-TRP is adopted and a DMRS configuration index is 8, then the assigned DMRS is 4 layers and ports 0-3. DMRS port groups of the two TRPs to be notified are {0, 1} and {2, 3}. The port groups may be numbered, and an index of the numbered port groups may be notified to the terminal, or a port number list may also be directly notified to the terminal.

It should be noted that any two port numbers among the port numbers of different TRPs are non-code-division multiplexed and non-time-domain orthogonal cover codes; that is, port numbers allocated for different TRPs in transmission of a PDSCH of a terminal need to be non-code-division multiplexing (CDM) and non-time-domain orthogonal cover codes (OCC). From a perspective of the UE, in order to reduce processing complexity and consider a problem of implementation restriction, ports of the same user that are code-division multiplexed (CDM) in a frequency domain cannot be assigned to different TRPs. It may also be required that TD-OCC ports cannot be assigned to different TRPs. If these restrictions are summarized, ports with the same padding contents (such as 0 and 1 in FIG. 1, the same padding is used in the FIG. 1) in FIG. 1 to FIG. 4 are obtained. If the ports are configured for the same user, then the ports cannot be assigned to different TRPs, but can only be sent on one TRP. If N TRPs adopt a unified DMRS configuration table, then the unified DMRS configuration table needs to be given based on the above principle.

Therefore, information of a DMRS port group of each TRP in a case of the multi-TRP may also be added in the above Table 2, and can be notified to the terminal as a whole DMRS configuration index. As a third example, referring to Table 3, Table 3 illustrates a condition of configuration information configurable in a multi-point transmission (taking two TRPs as an example):

TABLE 3

| Index of multi-TRP | Index of single-TRP | Number of ports | Port number | Port number (DMRS port group 1) | Port number (DMRS port group 2) | Number of ports (DMRS port groups 1, 2) |
|---|---|---|---|---|---|---|
| / | 0 | 1 | port0 | / | / | / |
| / | 1 | 1 | port1 | / | / | / |
| / | 2 | 1 | port2 | / | / | / |
| / | 3 | 1 | port3 | / | / | / |
| / | 4 | 1 | port4 | / | / | / |
| / | 5 | 1 | port5 | / | / | / |
| / | 6 | 1 | port6 | / | / | / |
| / | 7 | 1 | port7 | / | / | / |
| / | 8 | 2 | port0/1 | / | / | / |
| / | 9 | 2 | port2/3 | / | / | / |
| / | 10 | 2 | port4/5 | / | / | / |
| / | 11 | 2 | port6/7 | / | / | / |
| 0 | 12 | 2 | port0/2 | port0 | port2 | 1, 1 |
| 1 | 13 | 2 | port1/3 | port1 | port3 | 1, 1 |
| 2 | 14 | 2 | port4/6 | port4 | port6 | 1, 1 |
| 3 | 15 | 2 | port5/7 | port5 | port7 | 1, 1 |
| 4 | 16 | 3 | port0-2 | port0-1 | port2 | 2, 1 |
| 5 | 17 | 3 | port1-3 | port1 | port2-3 | 1, 2 |
| 6 | 18 | 3 | port4-6 | port4-5 | port6 | 2, 1 |
| 7 | 19 | 3 | port5-7 | port5 | port6-7 | 1, 2 |
| 8 | 20 | 4 | port0-3 | port0-1 | port2-3 | 2, 2 |
| / | 21 | 4 | port4-7 | / | / | / |
| 9 | 22 | 5 | port0-4 | port0-1, 4 | port2-3 | 3, 2 |
| 10 | 23 | 6 | port0-5 | port0-1, 4-5 | port2-3 | 4, 2 |
| 11 | 24 | 7 | port0-6 | port0-1, 4-5 | port2-3, 6 | 4, 3 |
| 12 | 25 | 8 | port0-7 | port0-1, 4-5 | port2-3, 6-7 | 4, 4 |

TABLE 3-continued

| Index of multi-TRP | Index of single-TRP | Number of ports | Port number | Port number (DMRS port group 1) | Port number (DMRS port group 2) | Number of ports (DMRS port groups 1, 2) |
|---|---|---|---|---|---|---|
| 13 | / | 4 | port0-2, 4 | port0-1, 4 | port2 | 3, 1 |
| 14 | / | 5 | port0-2, 4-5 | port0-1, 4-5 | port2 | 4, 1 |
| 15 | / | 6 | port0-4, 6 | port0-1, 4 | port2-3, 6 | 3, 3 |

In the above Table 3, if multiple TRPs are used and the index is 10, then the total number of ports of TRPs is 6 and the total port numbers are 0 to 5; wherein, the port number assigned by a TRP 1 is a DMRS port group 1, that is, 0 to 1, 4 to 5; the port number assigned by a TRP 2 is a DMRS port group 2, that is, 2 to 3; the number of ports of the DMRS port groups 1, 2 is 4 and 2, respectively.

Third way: Multiple TRPs use a unified DMRS configuration signaling to notify, so as to jointly configure the information of the DMRS configuration ports of the UE on all TRPs.

As a fourth example, referring to Table 4, Table 4 illustrates a condition of configuration information configurable in multi-point transmission (taking two TRPs as an example). A form of a DMRS configuration table can be an independent Table for the multi-TRP and the single-TRP. The following shows the DMRS configuration table for the multi-TRP independently. Referring to Table 4. An independent table for the single-TRP is shown in Table 1 above.

According to QCL information of multiple TRPs carried in the DCI information or other indication information indicating the type of TRPs, it can be known whether a current scheduling to the UE is the single TRP or the multi-TRP, and the DMRS configuration index can be parsed at the same time. If the index is X, then the total number of ports and port index information configured for the user may be determined through the Table 1 and the Table 4, respectively. If it is determined that the current scheduling to the UE is the single TRP, then the total number of DMRS ports and port information corresponding to the DMRS configuration index X is read through the Table 1. If the current scheduling to the UE is the multi-TRP, then the total number of DMRS ports, the number of ports, and port conditions of each TRP corresponding to the DMRS configuration index X are read through the Table 4.

TABLE 4

| Index | Total number of ports | Total port numbers | Port number (DMRS port group 1) | Port number (DMRS port group 2) | Number of ports (DMRS port groups 1, 2) |
|---|---|---|---|---|---|
| 0 | 2 layers | port0/2 | port0 | port2 | 1, 1 |
| 1 | 2 layers | port1/3 | port1 | port3 | 1, 1 |
| 2 | 2 layers | port4/6 | port4 | port6 | 1, 1 |
| 3 | 2 layers | port5/7 | port5 | port7 | 1, 1 |
| 4 | 3 layers | port0-2 | port0-1 | port2 | 2, 1 |
| 5 | 3 layers | port1-3 | port1 | port2-3 | 1, 2 |
| 6 | 3 layers | port4-6 | port4-5 | port6 | 2, 1 |
| 7 | 3 layers | port5-7 | port5 | port6-7 | 1, 2 |
| 8 | 4 layers | port0-2, 4 | port0-1, 4 | port2 | 3, 1 |
| 9 | 4 layers | port0-3 | port0-1 | port2-3 | 2, 2 |
| 10 | 5 layers | port0-1, 2, 4-5 | port0-1, 4-5 | port2 | 4, 1 |
| 11 | 5 layers | port0-4 | port0-1, 4 | port2-3 | 3, 2 |

TABLE 4-continued

| Index | Total number of ports | Total port numbers | Port number (DMRS port group 1) | Port number (DMRS port group 2) | Number of ports (DMRS port groups 1, 2) |
|---|---|---|---|---|---|
| 12 | 6 layers | port0-5 | port0-1, 4-5 | port2-3 | 4, 2 |
| 13 | 6 layers | port0-4, 6 | port0-1, 4 | port2-3, 6 | 3, 3 |
| 14 | 7 layers | port0-6 | port0-1, 4-5 | port2-3, 6 | 4, 3 |
| 15 | 8 layers | port0-7 | port0-1, 4-5 | port2-3, 6-7 | 4, 4 |

On the other hand, in some embodiments of the present disclosure, the Step 52 includes: sending the index and indication information to the terminal through downlink control information, wherein the indication information is configured to indicate a TRP type of a TRP corresponding to the index, and the TRP type is single-point transmission or multi-point transmission.

The TRP type includes the single TRP and the multi-TRP. The downlink control information carries the instruction information configured to indicate the TRP type of the TRP corresponding to the index, which is convenient for the terminal to query corresponding configuration information in a configuration table according to the determined TRP type.

Fourth way: Multiple TRPs uses a unified DMRS configuration signaling to perform notification, and the index includes a first-level index and a second-level index corresponding to the first-level index; the first-level index is an index associated with the total number of ports in the DMRS configuration table; the second-level index is an index associated with a port number in the DMRS configuration table.

The index is set as a first-level index and a second-level index corresponding to the first-level index; each first-level index may correspond to multiple second-level indexes; the first-level index is associated with the total port book; the second-level index is associated with port numbers of each. During a parsing process, the terminal may firstly determine the total number of ports according to the first-level index, and then further determine specific configuration information according to the second-level index.

As a fifth example, referring to Table 5, Table 5 illustrates a condition of configuration information configurable in multi-point transmission (taking two TRPs as an example):

TABLE 5

| First-level index | Second-level index | Number of ports | Port number | Port number (DMRS port group 1) | Port number (DMRS port group 2) | Number of ports (DMRS port groups 1, 2) |
|---|---|---|---|---|---|---|
| 0 | 0 | 2 | port0/2 | port0 | port2 | 1, 1 |
|   | 1 | 2 | port1/3 | port1 | port3 | 1, 1 |
|   | 2 | 2 | port4/6 | port4 | port6 | 1, 1 |
|   | 3 | 2 | port5/7 | port5 | port7 | 1, 1 |
| 1 | 0 | 3 | port0-2 | port0-1 | port2 | 2, 1 |
|   | 1 | 3 | port1-3 | port1 | port2-3 | 1, 2 |
|   | 2 | 3 | port4-6 | port4-5 | port6 | 2, 1 |
|   | 3 | 3 | port5-7 | port5 | port6-7 | 1, 2 |
| 2 | 0 | 4 | port0-2, 4 | port0-1, 4 | port2 | 3, 1 |
|   | 1 | 4 | port0-3 | port0-1 | port2-3 | 2, 2 |
| 3 | 0 | 5 | port0-1, 2, 4-5 | port0-1, 4-5 | port2 | 4, 1 |
|   | 1 | 5 | port0-4 | port0-1, 4 | port2-3 | 3, 2 |
| 4 | 0 | 6 | port0-5 | port0-1, 4-5 | port2-3 | 4, 2 |
|   | 1 | 6 | port0-4, 6 | port0-1, 4 | port2-3, 6 | 3, 3 |
| 5 | 0 | 7 | port0-6 | port0-1, 4-5 | port2-3, 6 | 4, 3 |
| 6 | 0 | 8 | port0-7 | port0-1, 4-5 | port2-3, 6-7 | 4, 4 |

In the Table 5 above, if the first-level index is indicated by using Si bits, the second-level index is indicated by using S2 bits, then a total overhead for the DMRS configuration signaling is S1+S2.

Fifth way: Multiple TRPs use a unified DMRS configuration signaling to perform notification, and the multiple TRPs include three TRPs. The DMRS configuration tables given in the above first way to fourth way are all based on DMRS patterns of FIG. 1 to FIG. 2 in the related art. In the patterns, due to the restriction that ports in a CDM group and different TD-OCC groups cannot be assigned to different TRPs, only a maximum of two TRPs may be supported to achieve the multi-TRP.

Figure 3:
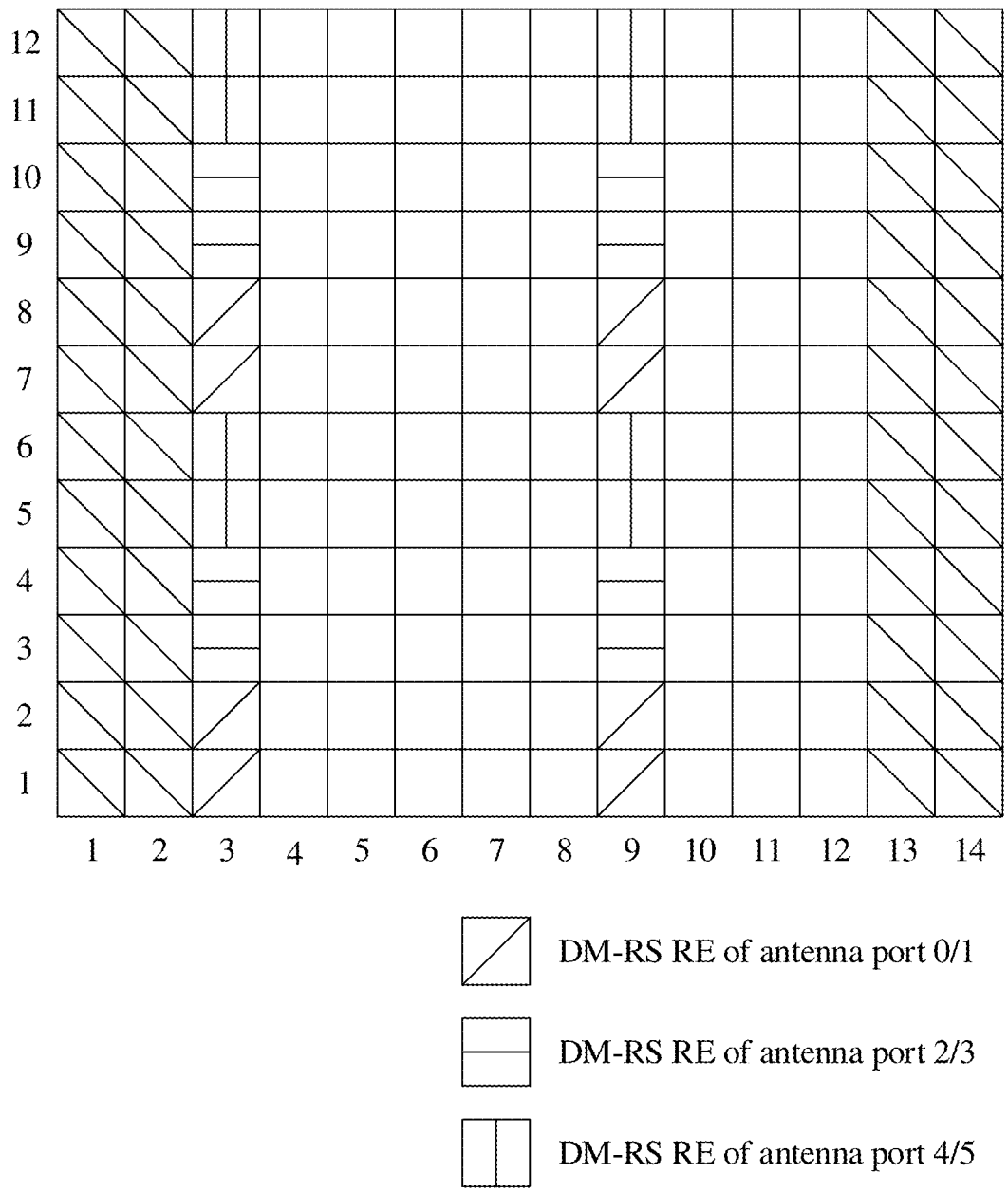
FIG. 3 is a third configuration mode of a demodulation reference signal in the related art.
Figure 4:
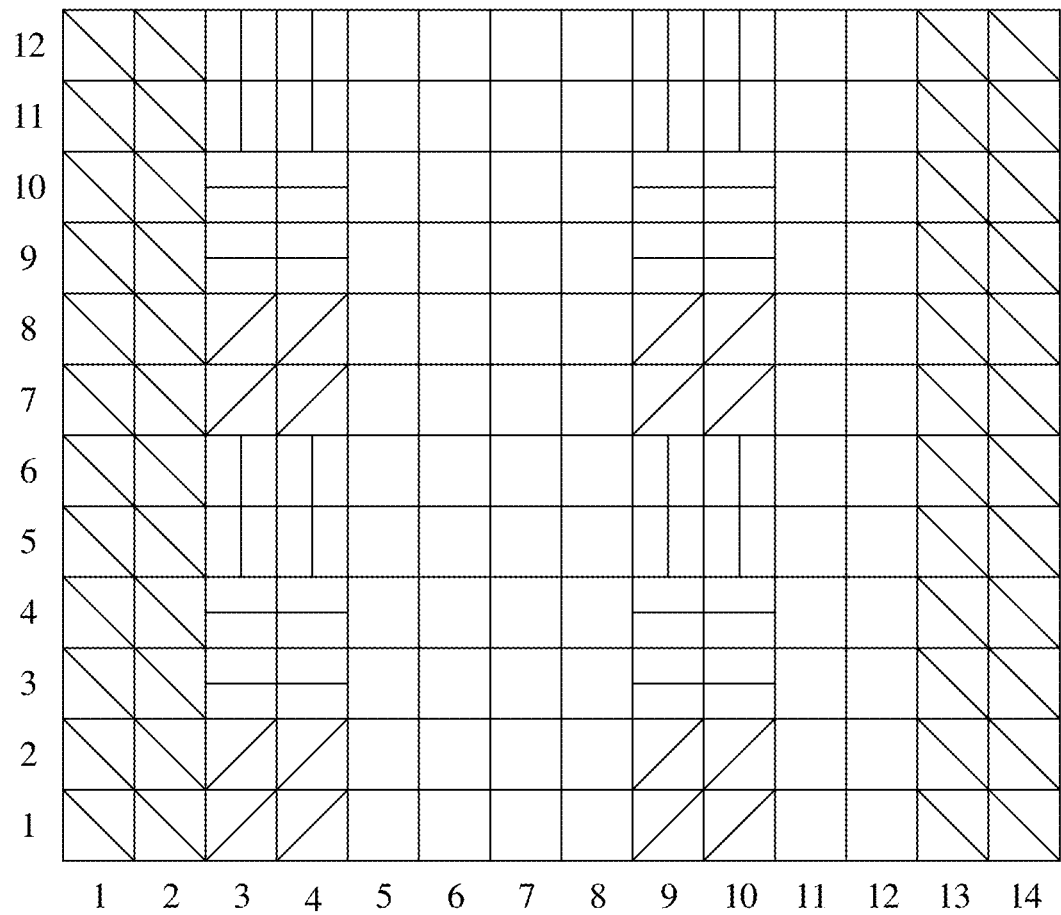
FIG. 4 is a fourth configuration mode of a demodulation reference signal in the related art.
Figure 4:
Figure 4:
Figure 4:

If the pattern is the DMRS patterns in FIG. 3 to FIG. 4, then a maximum of three TRPs may be supported according to a related restriction, so as to achieve the multi-TRP.

An example of a DMRS configuration table based on three TRPs is given on the basis of the third way, as shown in Table 6. Other solutions mentioned above can also support three TRPs simultaneously.

TABLE 6

| Index | Total number of ports | Total port numbers | Port number (DMRS port group 1) | Port number (DMRS port group 2) | Port number (DMRS port group 3) | Number of ports (DMRS port groups 1, 2, 3) |
|---|---|---|---|---|---|---|
| 0 | 3 layers | 0, 2, 4 | port0 | port2 | port4 | 1, 1, 1 |
| 1 | 3 layers | 1, 3, 5 | port1 | port3 | port5 | 1, 1, 1 |
| 2 | 3 layers | 6, 8, 10 | port6 | port8 | port10 | 1, 1, 1 |
| 3 | 3 layers | 7, 9, 11 | port7 | port9 | port11 | 1, 1, 1 |
| 4 | 4 layers | 0-2, 4 | port0-1 | port2 | port4 | 2, 1, 1 |
| 5 | 4 layers | 6-8, 10 | port6-7 | port8 | port10 | 2, 1, 1 |
| 6 | 5 layers | 0-4 | port0-1 | port2-3 | port4 | 2, 2, 1 |
| 7 | 6 layers | 0-5 | port0-1 | port2-3 | port4-5 | 2, 2, 2 |
| 8 | 6 layers | 6-11 | port6-7 | port8-9 | port10-11 | 2, 2, 2 |
| 9 | 6 layers | 0-4, 6 | port0-1, 6 | port2-3 | port4 | 3, 2, 1 |
| 10 | 7 layers | 0-6 | port0-1, 6 | port2-3 | port4-5 | 3, 2, 2 |
| 11 | 7 layers | 0-4, 6-7 | port0-1, 6-7 | port2-3 | port4 | 4, 2, 1 |
| 12 | 8 layers | 0-6, 8 | port0-1, 6 | port2-3, 8 | port4-5 | 3, 3, 2 |

In the above Table 6, if the index is 6, then the total number of ports is 5, the total port numbers are 0 to 4, port numbers assigned to the TRP 1 are 0 to 1, port numbers assigned to the TRP 2 are 2 to 3, and port numbers (the DMRS port group 3) assigned to the TRP 3 is 4; the number of ports of the three TRPs are 2, 2, and 1, respectively.

Optionally, on a basis of all the embodiments described above, whether or not to use the same PDSCH transmission may also be determined according to a port condition of each TRP. If the number of ports selected by each TRP is close to each other, then the TRPs may be assigned to the same PDSCH of a user; otherwise, it may be considered that different TRPs may be allocated to different PDSCHs, or a PDSCH of a user may be scheduled by using only a part of the TRPs. For example, if the total number of ports scheduled to the user is 6, then taking the Table 4 as an example, there are two options, i.e., the number of ports at different TRPs are {4, 2} and {3, 3} respectively. If the number of ports at the TRPs are equal, such as {3, 3}, the two TRPs are configured to the same PDSCH. If the number of ports is determined to be {4, 2}, then it may be considered that only the TRP 1 is used to transmit 4 ports, or the TRP 2 is simultaneously used to schedule another PDSCH of the user. In this way, the above tables can be further simplified and an overhead of signaling transmission can be reduced.

In the above solutions, the step of sending the index to the terminal through the downlink control information includes encapsulating the index in a preset field of the downlink control information, and sending the index to the terminal through the downlink control information; or adding a preset field for the index in the downlink control information, and sending the index to the terminal through the downlink control information.

In particular, in order to facilitate the terminal to identify an index, the index may be encapsulated in a preset field of the downlink control information, to inform the terminal of a location of the preset field and facilitate the terminal to acquire the index; and a preset field for the index may also be added, such as a preset identifier or an overhead, etc., to facilitate the terminal to identify the index.

In the above solution, the step of sending the index to the terminal through the downlink control information includes: encapsulating, in a preset field of the downlink control information, the index in a preset character format, and sending the index to the terminal through the downlink control information.

In this step, in a process of sending the index, the index may be sent in the preset character format, such as binary data or hexadecimal data, which is convenient for the terminal to parsing the index according to the preset character format.

According to some embodiments of the present disclosure, by configuring the index for DMRS configuration information of a TRP of multi-point transmission and sending the index to a terminal through the downlink control information, the DCI information may indicate DMRS configuration information of the PDSCH, and enable the terminal to query corresponding configuration information in a DMRS configuration table according to the index, so as to realize transmission of a Physical Downlink Shared Channel by a plurality of TRPs and save a signaling overhead by way of the index. The present disclosure addresses a problem of how to indicate DMRS configuration information of a PDSCH through the DCI information in a case that multiple TRPs simultaneously transmit a PDSCH.

It can be known that some embodiments of the present disclosure provide a solution for a scenario in which multiple TRPs simultaneously transmit one PDSCH. Some embodiments of the present disclosure fully consider a transmission manner of two TRPs, and also solve a problem of indicating DMRS configuration information transmitted through three TRPs.

Figure 6:
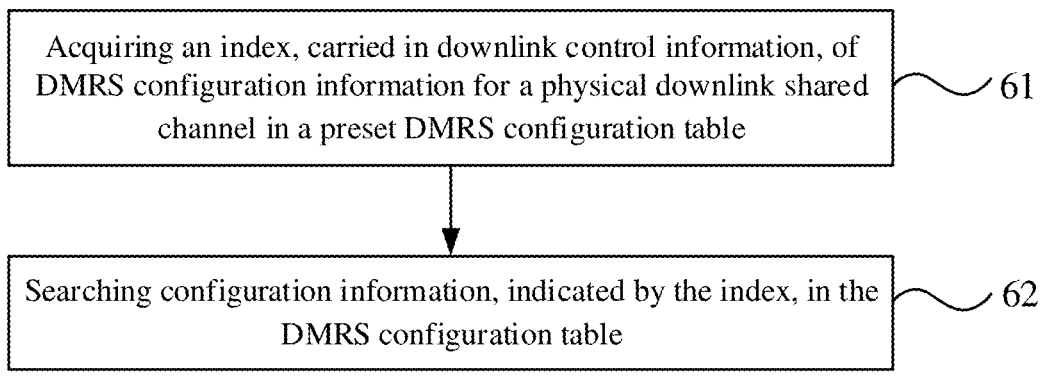
FIG. 6 is a flowchart of a method of receiving control information at a terminal side according to some embodiments of the present disclosure.

As shown in FIG. 6, some embodiments of the present disclosure also provide a method of receiving control information. The method of receiving control information is applied to a terminal. The method includes steps 61-62.

Step 61: acquiring an index, carried in Downlink Control Information, of Demodulation Reference Signal (DMRS) configuration information for a Physical Downlink Shared Channel in a preset DMRS configuration table.

In a case that the terminal receives the downlink control information, the terminal acquires the index carried in the downlink control information, and the Physical Downlink Shared Channel (PDSCH) is used to carry downlink service data, a paging message, and the like. In a case that one PDSCH is transmitted by using multiple TRPs, different TRPs may transmit different ports of the PDSCH, respectively, and finally a unified demodulation is performed as a one-time scheduling of the terminal. Therefore, it is necessary to notify the terminal of overall port allocation among the multiple TRPs through the DMRS configuration information, and notify the terminal of which ports are allocated to each TRP, and the DMRS allocation of the PDSCH is indicated through the Downlink Control Information (DCI).

In some embodiments of the present disclosure, there are a plurality of pieces of configuration information in a preset DMRS configuration table, wherein the configuration information includes the number of corresponding ports and port numbers allocated to a TRP; and there exists, in the DMRS configuration table, an index used to associate each piece of configuration information, that is, the index corresponding to the piece of configuration information in one-to-one correspondence manner, so that the terminal acquires the index carried in the DCI when the terminal receives the DCI.

Step 62: searching configuration information, indicated by the index, in the DMRS configuration table.

In this step, the terminal searches for the configuration information, indicated by the index, in the DMRS configuration table according to the index carried in the DCI, so as to determine the configuration information.

In the above solution, the step 62 includes determining a TRP type of a TRP corresponding to the index, wherein the TRP type includes single-point transmission and multi-point transmission; and searching, in the preset DMRS configuration table, the configuration information indicated by the index under the TRP type of the TRP corresponding to the index.

Specifically, referring to the Table 2 and the Table 3 in the first embodiment, cases of the single-point transmission and the multi-point transmission are included in each of the three configuration tables. Thus, in a process of demodulation by the terminal, the terminal needs firstly to determine the TRP type, and then needs to search for the configuration information indicated by the index under the TRP type.

In the above solution, the step of determining the TRP type of the TRP corresponding to the index includes: determining the TRP type of the TRP corresponding to the index based on indication information carried in the downlink control information and used for indicating the TRP type of the TRP corresponding to the index; or determining the TRP type of the TRP corresponding to the index based on Quasi Co-Location information carried in the downlink control information.

Specifically, according to the QCL information of the multiple TRPs carried in the DCI information or other indication information indicating the TRP type, it may be known whether a current scheduling to the UE is a single-TRP or a multi-TRP, and at the same time, the index of DMRS configuration can be obtained by parsing and may also be determined from a Quasi Co-Location (QCL), wherein the QCL information is used to indicate that different pieces of information belong to the same TRP, for example, the QCL information may include Channel State Information Reference Signal (CSIRS) configuration information that is quasi-co-located with a DMRS of each TRP, wherein pieces of information that are quasi-co-located have the same channel transmission characteristics, and the pieces of information can share channel characteristic information with each other. For example, the DMRS and the CSIRS1 on the TRP 1 are quasi-co-located and the DMRS and the CSIRS2 on the TRP 2 are quasi-co-located, which means that two TRPs exist and each of the two TRPs is provided with CSIRS1 and CSIRS2. It may be known from this information that two TRPs exist.

First Mode: single-point transmission. In the above step, the step of searching, in the preset DMRS configuration table, the configuration information indicated by the index under the TRP type of the TRP corresponding to the index, includes: in a case that the TRP type of the index is the single-point transmission, searching, in the preset DMRS configuration table, the number of ports and port numbers corresponding to a TRP of the single-point transmission indicated by each index under the type of single-point transmission.

In a case that the TRP type of the index is the single-point transmission, the configuration information indicated by an index under the type of the single-point transmission, and the number of ports and port numbers corresponding to the TRP of the single-point transmission indicated by the index (the number of ports and port numbers etc. in the same row as the index) may be searched in the preset DMRS configuration table. In this embodiment, the N TRPs are respectively considered as a single TRP, and each of the N TRPs is configured according to DMRS configuration information of a single TRP. Configuration information indicated by the index under the type of the single TRP is acquired from the preset DMRS configuration table. For example, in a case that the terminal supports two TRPs, then configuration information corresponding to respective indexes of the two TRPs is obtained from the DMRS configuration table respectively.

For example, referring to the Table 1 in the first embodiment, when only the type of the single-point transmission is included in Table 1, the configuration information indicated by the two indexes can be directly obtained; whereas for the Table 2 and the Table 3, the configuration information corresponding to the indexes under the type of the single-point transmission (a column of the index of single-TRP) needs to be searched.

Second Mode: the multi-point transmission; in the above solution, the step of searching, in the preset DMRS configuration information, the configuration information indicated by the index under the TRP type of the TRP corresponding to the index, includes: in a case that the TRP type is the multi-point transmission, searching, in the preset DMRS configuration table, the number of TRPs of the multi-point transmission indicated by the index and the number of ports supported by each of the TRPs under the type of the multi-point transmission.

In a case that the TRP type of the index is the multi-point transmission, configuration information indicated by the index under the type of the multi-point transmission (a column of the index of multi-TRP), the number of TRPs of the multi-point transmission indicated by the index, and the number of ports supported by each TRP is searched in the preset DMRS configuration table.

For example, referring to the Table 4 in the first embodiment, when only the type of multi-point transmission is included in the Table 4, the configuration information indicated by the two indexes can be directly obtained; whereas for the Table 2 and the Table 3, configuration information corresponding to the indexes need to be searched from the type of multi-point transmission.

In the above solution, the DMRS configuration table further includes port numbers and the number of ports allocated for each TRP; wherein any two of the port numbers of different TRPs are non-code-division multiplexed and non-time domain orthogonal cover codes.

In this step, for the multi-point transmission, the DMRS configuration table further includes port numbers and the number of ports allocated for each TRP, and gives which ports and the number of ports are allocated for each TRP, that is, a DMRS port group of each TRP. All possible combinations of ports of each TRP may be given by providing the DMRS port group allocated for each TRP separately, and the base station notifies the terminal of a corresponding index. The terminal queries configuration information in the DMRS configuration table according to the index.

Third Mode: multi-point transmission. The index includes a first-level index and a second-level index corresponding to the first-level index.

In the above solution, the index includes the first-level index and the second-level index corresponding to the first-level index; the first-level index is an index associated with the total number of ports in the DMRS configuration table; the second-level index is an index associated with port numbers in the DMRS configuration table.

The index is set as the first-level index and the second-level index corresponding to the first-level index. Each first-level index may correspond to a plurality of second-level indexes; the first-level index is associated with the total number of ports; and the second-level index is associated with the port numbers of each TRP. In a process of parsing by the terminal, the terminal may firstly determine the total number of ports according to the first-level index and then determine specific configuration information according to the second-level index.

Fourth Mode: Multiple TRPs use a unified DMRS configuration signaling to perform notification, and the multiple TRPs include three TRPs. The DMRS configuration tables given in the above first mode to third mode are all based on DMRS patterns of FIG. 1 to FIG. 2 in the related art. In the patterns, due to the restriction that ports in a CDM group and different TD-OCC groups cannot be assigned to different TRPs, only a maximum of two TRPs may be supported to achieve the multi-TRP.

If the pattern is the DMRS pattern in FIG. 3 to FIG. 4, then a maximum of three TRPs may be supported according to a related restriction, so as to achieve the multi-TRP.

An example of a DMRS configuration table based on three TRPs is given on the basis of the second mode. As shown in the Table 6 in the first embodiment. Other solutions mentioned above can also support three TRPs simultaneously.

In a case that three TRPs are included, the total number of ports and total port numbers of the three TRPs and the respective number of ports and respective port numbers of each TRP are searched from the Table 6 according to the index by the terminal.

In the above Table 6, if the index received by the terminal is 6, then the total number of ports is 5, the total port numbers are 0 to 4, port numbers assigned to the TRP 1 are 0 to 1, port numbers assigned to the TRP 2 are 2 to 3, and port numbers assigned to the TRP 3 is 4; the number of ports of the three TRPs are 2, 2, and 1, respectively.

In the above solution, the step of searching configuration information indicated by the index in the DMRS configuration table includes: searching the second-level index corresponding to the first-level index in the DMRS configuration table; searching configuration information indicated by the second-level index in the DMRS configuration table.

Specifically, in a process of searching by the terminal, the terminal firstly searches the corresponding second-level index according to the first-level index, and then determines the configuration information according to the second-level index.

Referring to the Table 5 in the first embodiment, the Table 5 illustrates a condition of configuration information configurable in multi-point transmission (taking two TRPs as an example). If the first-level index is indicated by using S1 bits, the second-level index is indicated by using S2 bits, then a total overhead for the DMRS configuration signaling is S1+S2.

In the above solution, the step of acquiring the index, carried in Downlink Control Information, of configuration information of the Demodulation Reference Signal (DMRS) for the Physical Downlink Shared Channel in the preset DMRS configuration table includes: acquiring the index, from a preset field in the Downlink Control Information, of the Demodulation Reference Signal (DMRS) configuration information for the Physical Downlink Shared Channel in the preset DMRS configuration table; or acquiring bytes added with a preset field in the Downlink Control Information, the bytes added with a preset field are the index of the Demodulation Reference Signal (DMRS) configuration information for the Physical Downlink Shared Channel in the preset DMRS configuration table.

Specifically, the terminal identifies the index according to a predetermined manner, such as acquires the index in the preset field of the downlink control information, or acquires the index from the bytes added with the preset field, wherein the preset field may be a preset identifier or an overhead, etc.

In the above solution, the step of acquiring the index, carried in Downlink Control Information, of configuration information of the Demodulation Reference Signal (DMRS) for the Physical Downlink Shared Channel in the preset DMRS configuration table includes: acquiring a field having a preset character format from a preset field in the Downlink Control Information, the field having the preset character format is the index of the Demodulation Reference Signal (DMRS) configuration information for the Physical Downlink Shared Channel in the preset DMRS configuration table.

In this step, in the process of parsing the index, the parsing may be performed by using a preset character format, such as binary data or hexadecimal data.

In summary, by acquiring the index, in a preset DMRS configuration table, of DMRS configuration information for the PDSCH carried in the downlink control information in some embodiments of the present disclosure, the configuration information indicated by the index in the preset DMRS configuration table is searched. Thus, the terminal can query the corresponding configuration information in the DMRS configuration table according to the index and realize transmission of one physical downlink share channel by using multiple TRPs. In this way, a signaling overhead is saved through using an index. The present disclosure solves a problem of how to indicate DMRS configuration information of a PDSCH in a case that multiple TRPs transmit the PDSCH simultaneously.

It can be seen that some embodiments of the present disclosure provide a solution for a scenario in which multiple TRPs simultaneously transmit one PDSCH. Some embodiments of the present disclosure fully consider a transmission manner of two TRPs, and also solve a problem of indicating the DMRS configuration information in a case that three TRPs perform transmission.

Figure 7:
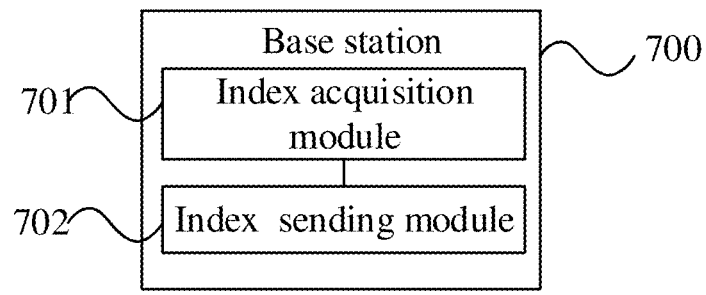
FIG. 7 is a schematic diagram of modules in a base station according to some embodiments of the present disclosure.

As shown in FIG. 7, some embodiments of the present disclosure further provide a base station 700. The base station 700 includes an index acquisition module 701, configured to acquire an index, in a preset DMRS configuration table, of Demodulation Reference Signal (DMRS) configuration information of a Physical Downlink Shared Channel (PDSCH); and an index sending module 702, configured to send the index to the terminal through downlink control information.

In the above solution, the index acquisition module 701 includes an acquisition sub-module, configured to acquire, from the preset DMRS configuration table, an index corresponding to configuration information that meets a configuration condition of the terminal, wherein the configuration information includes the total number of ports and total port numbers and the configuration condition includes the number of TRPs currently supported by the terminal and the number of ports supported by each TRP.

In the above solution, the acquisition sub-module includes a single transmission-reception-point acquisition unit configured to acquire, from the preset DMRS configuration table, an index corresponding to configuration information that matches each TRP in single-point transmission currently supported by the terminal; wherein the total number of ports included in each piece of configuration information does not exceed the number of ports supported by the TRP corresponding to the configuration information.

In the above solution, the index sending module 702 includes a first sending sub-module, configured to send, to the terminal through the downlink control information, an index corresponding to configuration information corresponding to each TRP currently supported by the terminal.

In the above solution, the acquisition sub-module includes a multi-transmission-reception-point acquisition unit, configured to acquire, from the preset DMRS configuration table, an index corresponding to configuration information in which the number of TRPs included in multi-point transmission matches the number of TRPs for the terminal, and the total number of ports does not exceed the total number of ports supported by the terminal.

In the above solution, the DMRS configuration table further includes a port number and the number of ports allocated for each TRP; wherein any two port numbers among port numbers of different TRPs are non-code-division multiplexed and non-time-domain orthogonal cover codes.

In the above solution, the index sending module 702 includes a second sending sub-module, configured to send the index and indication information to the terminal through downlink control information, wherein the indication information is configured to indicate a TRP type of a TRP corresponding to the index, and the TRP type is single-point transmission or multi-point transmission.

In the above solution, the index includes a first-level index and a second-level index corresponding to the first-level index; the first-level index is an index associated with the total number of ports in the DMRS configuration table; the second-level index is an index associated with a port number in the DMRS configuration table.

In the above solution, the index sending module 702 includes a third sending sub-module, configured to encapsulate the index in a preset field of the downlink control information, and send the index to the terminal through the downlink control information; or add a preset field for the index in the downlink control information, and send the index to the terminal through the downlink control information.

In the above solution, the index sending module 702 includes a fourth sending sub-module, configured to encapsulate, in a preset field of the downlink control information, the index in a preset character format, and send the index to the terminal through downlink control information.

In summary, by configuring the index for DMRS configuration information of a TRP of multi-point transmission and sending the index to a terminal through the downlink control information according to some embodiments of the present disclosure, the DCI information may indicate DMRS configuration information of the PDSCH, and enable the terminal to query corresponding configuration information in a DMRS configuration table according to the index, so as to realize transmission of a Physical Downlink Shared Channel by a plurality of TRPs and save a signaling overhead by way of the index. The present disclosure addresses a problem of how to indicate DMRS configuration information of a PDSCH through the DCI information in a case that multiple TRPs simultaneously transmit the PDSCH.

Figure 8:
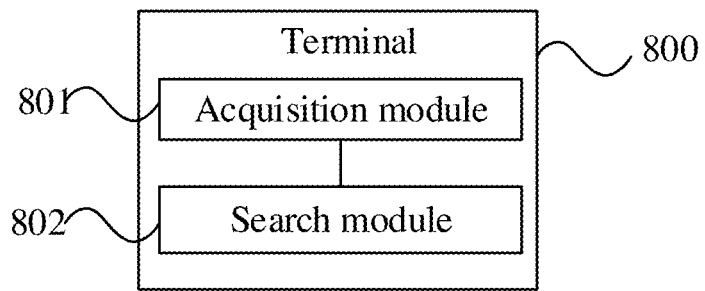
FIG. 8 is a schematic diagram of modules in a terminal according to some embodiments of the present disclosure.

As shown in FIG. 8, some embodiments of the present disclosure further provide a terminal 800. The terminal 800 includes: an acquisition module 801, configured to acquire an index, carried in Downlink Control Information, of Demodulation Reference Signal (DMRS) configuration information for a Physical Downlink Shared Channel in a preset DMRS configuration table; and a search module 802, configured to search configuration information, indicated by the index, in the DMRS configuration table.

In the above solution, the search module 802 includes a type determination sub-module, configured to determine a TRP type of a TRP corresponding to the index, wherein the TRP type includes single-point transmission and multi-point transmission; and an information search sub-module, configured to search, in the preset DMRS configuration table, the configuration information indicated by the index under the TRP type of the TRP corresponding to the index.

In the above solution, the information search sub-module includes a single transmission-reception-point search unit, configured to: in a case that the TRP type of the index is the single-point transmission, search, in the preset DMRS configuration table, the number of ports and port numbers corresponding to the TRP of the single-point transmission indicated by the index under the type of the single-point transmission.

In the above solution, the information search sub-module includes a multi-transmission-reception-point search unit, configured to: in a case that the TRP type is the multi-point transmission, search, in the preset DMRS configuration table, the number of TRPs of the multi-point transmission indicated by the index and the number of ports supported by each of the TRPs under the type of the multi-point transmission.

In the above solution, the type determination sub-module includes: a first determination unit, configured to determine a TRP type of a TRP corresponding to the index based on indication information carried in the downlink control information and used for indicating the TRP type of the TRP corresponding to the index; or a second determination unit, configured to determine the TRP type of the TRP corresponding to the index based on Quasi Co-Location information carried in the downlink control information.

In the above solution, the DMRS configuration table further includes port numbers and the number of ports allocated for each TRP; wherein any two of the port numbers of different TRPs are non-code-division multiplexed and non-time domain orthogonal cover codes.

In the above solution, the index includes a first-level index and a second-level index corresponding to the first-level index; the first-level index is an index associated with the total number of ports in the DMRS configuration table; the second-level index is an index associated with port numbers in the DMRS configuration table.

In the above solution, the search module 802 includes an index search sub-module, configured to search the second-level index corresponding to the first-level index in the DMRS configuration table, and search configuration information indicated by the second-level index in the DMRS configuration table.

In the above solution, the acquisition module 801 includes a first acquisition sub-module, configured to acquire, from a preset field in the Downlink Control Information, the index of the Demodulation Reference Signal (DMRS) configuration information for the Physical Downlink Shared Channel in the preset DMRS configuration table; or a second acquisition module, configured to acquire bytes added with a preset field in the Downlink Control Information, wherein the bytes added with a preset field are the index of the Demodulation Reference Signal (DMRS) configuration information for the Physical Downlink Shared Channel in the preset DMRS configuration table.

In the above solution, the acquisition module 801 includes a third acquisition sub-module, configured to acquire a field having a preset character format from a preset field in the Downlink Control Information, wherein the field having the preset character format is the index of the Demodulation Reference Signal (DMRS) configuration information for the Physical Downlink Shared Channel in the preset DMRS configuration table.

In summary, by acquiring the index, in a preset DMRS configuration table, of DMRS configuration information for the PDSCH carried in the downlink control information in some embodiments of the present disclosure, the configuration information indicated by the index is searched in the preset DMRS configuration table. Thus, the terminal 800 can query the corresponding configuration information in the DMRS configuration table according to the index and realize transmission of one physical downlink share channel by using multiple TRPs. In this way, a signaling overhead is saved through using an index. The present disclosure solves a problem of how to indicate DMRS configuration information of a PDSCH in a case that multiple TRPs transmit the PDSCH simultaneously.

Figure 9:
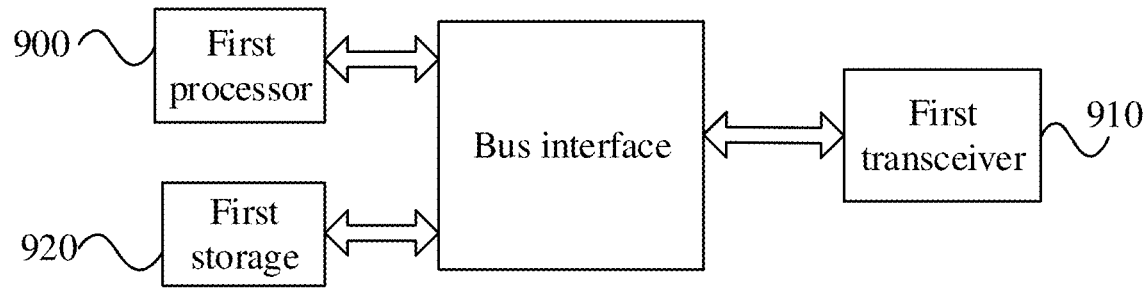
FIG. 9 is a structural block diagram of a base station according to some embodiments of the present disclosure.

As shown in FIG. 9, some embodiments of the present disclosure also provide a base station. The base station includes a first storage 920, a first processor 900, and a computer program stored on the first storage 920 and executable by the processor. The first processor 900 is configured to read the program in the first storage 920, so that the first processor 900 is controlled to perform following steps: acquiring an index, in a preset DMRS configuration table, of Demodulation Reference Signal (DMRS) configuration information of a Physical Downlink Shared Channel (PDSCH), and wherein a first transceiver 910 is configured to send the index to the terminal through downlink control information.

In FIG. 9, a bus architecture may include any number of interconnected buses and bridges. In particular, various circuits such as one or more processors represented by the first processor 900 and a storage represented by the first storage 920 are linked together. The bus architecture may also link together a variety of other circuits, such as peripherals, voltage regulators, power management circuits, and the like, which are well known in the art and, therefore, will not be described further herein. A bus interface provides an interface. The first transceiver 910 may be a plurality of elements including a transmitter and a receiver, for providing means for communicating with various other devices over a transmission medium. The first processor 900 is responsible for managing the bus architecture and general processing, and the first storage 920 may store data used by the first processor 900 when the first processor 900 performs operations.

Acquiring an index, by the first processor 900 in a preset DMRS configuration table, of DMRS configuration information of a PDSCH, specifically includes: acquiring, from the preset DMRS configuration table, an index corresponding to configuration information that meets a configuration condition of the terminal, wherein the configuration information includes the total number of ports and total port numbers and the configuration condition includes the number of TRPs currently supported by the terminal and the number of ports supported by each TRP.

Acquiring, from the preset DMRS configuration table, an index corresponding to configuration information that meets a configuration condition of the terminal, specifically includes: acquiring, from the preset DMRS configuration table, an index corresponding to configuration information that matches each TRP in single-point transmission currently supported by the terminal; wherein the total number of ports included in each piece of configuration information does not exceed the number of ports supported by the TRP corresponding to the configuration information.

Sending the index to the terminal through the downlink control information by the first transceiver 910, specifically includes sending, to the terminal through the downlink control information, an index corresponding to configuration information corresponding to each TRP currently supported by the terminal.

Acquiring, by the first processor 900 from the preset DMRS configuration table, an index corresponding to configuration information that meets a configuration condition of the terminal, specifically includes: acquiring, from the preset DMRS configuration table, an index corresponding to configuration information in which the number of TRPs included in multi-point transmission matches the number of TRPs for the terminal, and the total number of ports does not exceed the total number of ports supported by the terminal.

The DMRS configuration table further includes a port number and the number of ports allocated for each TRP; wherein any two port numbers among port numbers of different TRPs are non-code-division multiplexed and non-time-domain orthogonal cover codes.

Sending the index to the terminal through the downlink control information by the first transceiver 910 specifically includes: sending the index and indication information to the terminal through downlink control information, wherein the indication information is configured to indicate a TRP type of a TRP corresponding to the index, and the TRP type is single-point transmission or multi-point transmission.

The index includes a first-level index and a second-level index corresponding to the first-level index; the first-level index is an index associated with the total number of ports in the DMRS configuration table; the second-level index is an index associated with a port number in the DMRS configuration table.

Sending the index to the terminal through the downlink control information by the first transceiver 910 specifically includes: encapsulating the index in a preset field of the downlink control information, and sending the index to the terminal through the downlink control information; or adding a preset field for the index in the downlink control information, and sending the index to the terminal through the downlink control information.

Sending the index to the terminal through the downlink control information by the first transceiver 910 specifically includes: encapsulating, in a preset field of the downlink control information, the index in a preset character format, and sending the index to the terminal through the downlink control information.

Figure 10:
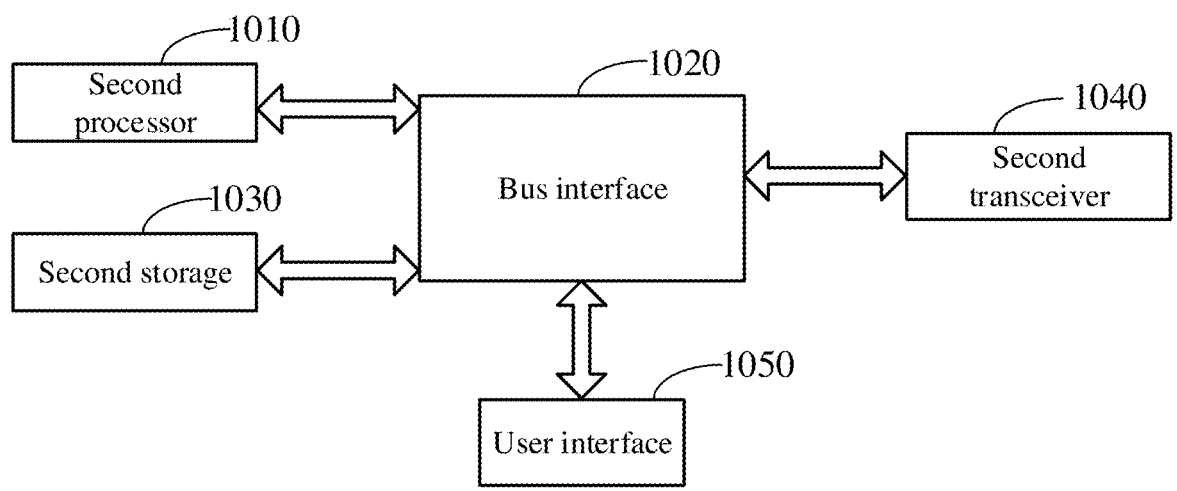
FIG. 10 is a structural block diagram of a terminal according to some embodiments of the present disclosure.

To better achieve the above objective, as shown in FIG. 10, the present disclosure also provides a terminal. The terminal includes a second processor 1010, a second storage 1030 connected to the second processor 1010 through a bus interface 1020, and a second transceiver 1040 connected to the second processor 1010 through the bus interface 1020, wherein the second storage 1030 is configured to store a program and data used by the second processor 1010 when the second processor 1010 performs operations, and the second transceiver 1040 is configured to receive and send data under a control of the second processor 1010.

The second processor 1010 is configured for acquiring an index, carried in Downlink Control Information, of Demodulation Reference Signal (DMRS) configuration information for a Physical Downlink Shared Channel in a preset DMRS configuration table; and searching configuration information, indicated by the index, in the DMRS configuration table.

Searching configuration information, indicated by the index, in the DMRS configuration table by the second processor 1010 specifically includes determining a TRP type of a TRP corresponding to the index, wherein the TRP type includes single-point transmission and multi-point transmission; and searching, in the preset DMRS configuration table, the configuration information indicated by the index under the TRP type of the TRP corresponding to the index.

Searching, in the preset DMRS configuration table by the second processor 1010, the configuration information indicated by the index under the TRP type of the TRP corresponding to the index specifically includes: in a case that the TRP type of the index is the single-point transmission, searching, in the preset DMRS configuration table, the number of ports and port numbers corresponding to the TRP of the single-point transmission indicated by the index under the type of the single-point transmission.

Searching, in the preset DMRS configuration table by the second processor 1010, the configuration information indicated by the index under the TRP type of the TRP corresponding to the index specifically includes: in a case that the TRP type is the multi-point transmission, searching, in the preset DMRS configuration table, the number of TRPs of the multi-point transmission indicated by the index and the number of ports supported by each of the TRPs under the type of the multi-point transmission.

Determining a TRP type of a TRP corresponding to the index by the second processor 1010 specifically includes: determining a TRP type of a TRP corresponding to the index based on indication information carried in the downlink control information and used for indicating the TRP type of the TRP corresponding to the index; or determining the TRP type of the TRP corresponding to the index based on Quasi Co-Location information carried in the downlink control information.

The DMRS configuration table further includes port numbers and the number of ports allocated for each TRP; wherein any two of the port numbers of different TRPs are non-code-division multiplexed and non-time domain orthogonal cover codes.

The index includes a first-level index and a second-level index corresponding to the first-level index; the first-level index is an index associated with the total number of ports in the DMRS configuration table; the second-level index is an index associated with port numbers in the DMRS configuration table Searching the configuration information, indicated by the index, in the DMRS configuration table by the second processor 1010 specifically includes: searching the second-level index corresponding to the first-level index in the DMRS configuration table, and searching configuration information indicated by the second-level index in the DMRS configuration table.

Acquiring the index, carried in the Downlink Control Information, of Demodulation Reference Signal (DMRS) configuration information for the Physical Downlink Shared Channel in the preset DMRS configuration table by the second processor 1010, specifically includes: acquiring, from a preset field in the Downlink Control Information, the index of the Demodulation Reference Signal (DMRS) configuration information for the Physical Downlink Shared Channel in the preset DMRS configuration table; or acquiring bytes added with a preset field in the Downlink Control Information, wherein the bytes added with a preset field are the index of the Demodulation Reference Signal (DMRS) configuration information for the Physical Downlink Shared Channel in the preset DMRS configuration table.

Acquiring the index, carried in the Downlink Control Information, of Demodulation Reference Signal (DMRS) configuration information for the Physical Downlink Shared Channel in the preset DMRS configuration table by the second processor 1010, specifically includes: acquiring a field having a preset character format from a preset field in the Downlink Control Information, wherein the field having the preset character format is the index of the Demodulation Reference Signal (DMRS) configuration information for the Physical Downlink Shared Channel in the preset DMRS configuration table.

It should be noted that in FIG. 10, a bus architecture may include any number of interconnected buses and bridges. In particular, various circuits such as one or more processors represented by the second processor 1010 and a storage represented by the second storage 1030 are linked together. The bus architecture may also link together a variety of other circuits, such as peripherals, voltage regulators, power management circuits, and the like, which are well known in the art and, therefore, will not be described further herein. A bus interface provides an interface. The second transceiver 1040 may be a plurality of elements including a transmitter and a receiver, for providing means for communicating with various other devices over a transmission medium. A user interface 1050 in different user terminals may also connect an external necessary device or an internal necessary device, such as, but not limited to a keypad, a display, a speaker, a microphone, a joystick. The second processor 1010 is responsible for managing the bus architecture and general processing, and the second storage 1030 may store data used by the second processor 1010 when the second processor 1010 performs operations.

It will be appreciated by those skilled in the art that all or a part of the steps of implementing the embodiments described above may be accomplished by hardware, or may be accomplished through a computer program indicating associated hardware. The computer program includes instructions for executing some or all of the steps of the method described above; and the computer program may be stored in a readable storage medium, which may be any form of storage medium, such as a volatile storage medium or a non-volatile storage medium Storage medium.

Furthermore, it should be noted that in the devices and the methods of the present disclosure, components or steps may be obviously disassembled and/or recombined. The decomposition and/or the recombination should be considered as equivalent solutions of the present disclosure. Also, the steps of performing a series of processes described above may naturally be performed in a chronological order or in an order described above, without necessarily being performed in the chronological order, and some steps may be performed in parallel or independently of each other. It will be understood by those of ordinary skills in the art that all or any of the steps or the components of the method and the device of the present disclosure may be implemented in any computing device (including a processor, a storage medium, etc.) or a network of computing devices by way of hardware, firmware, software, or a combination thereof, which can be implemented by those of ordinary skills in the art by using their basic programming skills upon reading the description of the present disclosure.

Accordingly, the objective of the present disclosure may also be achieved by executing a program or a set of programs on any computing device. The computing device may be a well-known general-purpose device. Accordingly, the objective of the present disclosure may also be achieved by merely providing a program product including a program code for implementing the method or the device. That is, such a program product also constitutes the present disclosure, and a storage medium in which such a program product is stored also constitutes the present disclosure. Obviously, the storage medium may be any known storage medium or any storage medium developed in the future. It should also be noted that in the devices and the methods of the present disclosure, the components or the steps may obviously be disassembled and/or recombined. The decomposition and/or the recombination should be considered as equivalent solutions of the present disclosure. Also, the steps of performing a series of processes described above may naturally be performed in a chronological order or in an order described above, without necessarily being performed in the chronological order, and some steps may be performed in parallel or independently of each other.

Some embodiments of the present disclosure also provide a computer readable storage medium having stored thereon a computer program. In a case that the computer program is executed by a processor, the processor implements the steps of acquiring an index, in a preset DMRS configuration table, of Demodulation Reference Signal (DMRS) configuration information of a Physical Downlink Shared Channel (PDSCH), and sending the index to a terminal through downlink control information.

Acquiring an index, in a preset DMRS configuration table, of DMRS configuration information of a PDSCH, specifically includes: acquiring, from the preset DMRS configuration table, an index corresponding to configuration information that meets a configuration condition of the terminal, wherein the configuration information includes the total number of ports and total port numbers and the configuration condition includes the number of TRPs currently supported by the terminal and the number of ports supported by each TRP.

Acquiring, from the preset DMRS configuration table, an index corresponding to configuration information that meets a configuration condition of the terminal, specifically includes: acquiring, from the preset DMRS configuration table, an index corresponding to configuration information that matches each TRP in single-point transmission currently supported by the terminal; wherein the total number of ports included in each piece of configuration information does not exceed the number of ports supported by the TRP corresponding to the configuration information.

Sending the index to the terminal through the downlink control information, specifically includes sending, to the terminal through the downlink control information, an index corresponding to configuration information corresponding to each TRP currently supported by the terminal.

Acquiring, from the preset DMRS configuration table, an index corresponding to configuration information that meets a configuration condition of the terminal, specifically includes: acquiring, from the preset DMRS configuration table, an index corresponding to configuration information in which the number of TRPs included in multi-point transmission matches the number of TRPs for the terminal, and the total number of ports does not exceed the total number of ports supported by the terminal.

The DMRS configuration table further includes a port number and the number of ports allocated for each TRP; wherein any two port numbers among port numbers of different TRPs are non-code-division multiplexed and non-time-domain orthogonal cover codes.

Sending the index to the terminal through the downlink control information specifically includes: sending the index and indication information to the terminal through downlink control information, wherein the indication information is configured to indicate a TRP type of a TRP corresponding to the index, and the TRP type is single-point transmission or multi-point transmission.

The index includes a first-level index and a second-level index corresponding to the first-level index; the first-level index is an index associated with the total number of ports in the DMRS configuration table; the second-level index is an index associated with a port number in the DMRS configuration table.

Sending the index to the terminal through the downlink control information specifically includes: encapsulating the index in a preset field of the downlink control information, and sending the index to the terminal through the downlink control information; or adding a preset field for the index in the downlink control information, and sending the index to the terminal through the downlink control information.

Sending the index to the terminal through the downlink control information specifically includes: encapsulating, in a preset field of the downlink control information, the index in a preset character format, and sending the index to the terminal through the downlink control information.

Some embodiments of the present disclosure also provide a computer readable storage medium having a computer program stored thereon. In a case that the program is executed by a processor, the processor implements following steps: acquiring an index, carried in Downlink Control Information, of Demodulation Reference Signal (DMRS) configuration information for a Physical Downlink Shared Channel in a preset DMRS configuration table; and searching configuration information, indicated by the index, in the DMRS configuration table.

Searching configuration information, indicated by the index, in the DMRS configuration table specifically includes determining a TRP type of a TRP corresponding to the index, wherein the TRP type includes single-point transmission and multi-point transmission; and searching, in the preset DMRS configuration table, the configuration information indicated by the index under the TRP type of the TRP corresponding to the index.

Searching, in the preset DMRS configuration table, the configuration information indicated by the index under the TRP type of the TRP corresponding to the index specifically includes: in a case that the TRP type of the index is the single-point transmission, searching, in the preset DMRS configuration table, the number of ports and port numbers corresponding to the TRP of the single-point transmission indicated by the index under the type of the single-point transmission.

Searching, in the preset DMRS configuration table, the configuration information indicated by the index under the TRP type of the TRP corresponding to the index specifically includes: in a case that the TRP type is the multi-point transmission, searching, in the preset DMRS configuration table, the number of TRPs of the multi-point transmission indicated by the index and the number of ports supported by each of the TRPs under the type of the multi-point transmission.

Determining a TRP type of a TRP corresponding to the index specifically includes: determining a TRP type of a TRP corresponding to the index based on indication information carried in the downlink control information and used for indicating the TRP type of the TRP corresponding to the index; or determining the TRP type of the TRP corresponding to the index based on Quasi Co-Location information carried in the downlink control information.

The DMRS configuration table further includes port numbers and the number of ports allocated for each TRP; wherein any two of the port numbers of different TRPs are non-code-division multiplexed and non-time domain orthogonal cover codes.

The index includes a first-level index and a second-level index corresponding to the first-level index; the first-level index is an index associated with the total number of ports in the DMRS configuration table; the second-level index is an index associated with port numbers in the DMRS configuration table.

Searching the configuration information, indicated by the index, in the DMRS configuration table includes: searching the second-level index corresponding to the first-level index in the DMRS configuration table, and searching configuration information indicated by the second-level index in the DMRS configuration table.

Acquiring the index, carried in the Downlink Control Information, of Demodulation Reference Signal (DMRS) configuration information for the Physical Downlink Shared Channel in the preset DMRS configuration table includes: acquiring, from a preset field in the Downlink Control Information, the index of the Demodulation Reference Signal (DMRS) configuration information for the Physical Downlink Shared Channel in the preset DMRS configuration table; or acquiring bytes added with a preset field in the Downlink Control Information, wherein the bytes added with a preset field are the index of the Demodulation Reference Signal (DMRS) configuration information for the Physical Downlink Shared Channel in the preset DMRS configuration table.

Acquiring the index, carried in the Downlink Control Information, of Demodulation Reference Signal (DMRS) configuration information for the Physical Downlink Shared Channel in the preset DMRS configuration table includes: acquiring a field having a preset character format from a preset field in the Downlink Control Information, wherein the field having the preset character format is the index of the Demodulation Reference Signal (DMRS) configuration information for the Physical Downlink Shared Channel in the preset DMRS configuration table.

What has been described above are optional embodiments of the present disclosure, and it should be noted that those of ordinary skills in the art may make several improvements and embellishments without departing from the principle of the present disclosure. The improvements and the embellishments should also be considered to be within the protection scope of the present disclosure.

What is claimed is:

1. A method of sending control information, the method being applied to a base station and comprising:
acquiring an index, in a preset Demodulation Reference Signal (DMRS) configuration table, of DMRS configuration information of a physical downlink shared channel; and
sending the index to a terminal through downlink control information;
wherein acquiring the index, in the present DMRS configuration table, of the DMRS configuration information of the physical downlink shared channel, comprises:
acquiring, from the preset DMRS configuration table, the index corresponding to the DMRS configuration information that meets a configuration condition of the terminal, wherein the DMRS configuration information comprises the total number of ports and total port numbers and the configuration condition comprises the number of Transmission Reception Points (TRP) currently supported by the terminal and the number of ports supported by each TRP.

2. The method according to claim 1, wherein acquiring, from the preset DMRS configuration table, the index corresponding to the DMRS configuration information that meets the configuration condition of the terminal, comprises:
acquiring, from the preset DMRS configuration table, an index corresponding to the DMRS configuration information that matches each TRP in single-point transmission currently supported by the terminal; wherein the total number of ports comprised in each piece of configuration information does not exceed the number of ports supported by the TRP corresponding to the DMRS configuration information.

3. The method according to claim 1, wherein acquiring, from the preset DMRS configuration table, the index corresponding to the DMRS configuration information that meets the configuration condition of the terminal, comprises:
acquiring, from the preset DMRS configuration table, an index corresponding to the DRMS configuration information in which the number of TRPs comprised in multi-point transmission matches the number of TRPs for the terminal, and the total number of ports does not exceed the total number of ports supported by the terminal.

4. The method according to claim 3, wherein the DMRS configuration table further comprises a port number and the number of ports allocated for each TRP; wherein any two port numbers among port numbers of different TRPs are non-code-division multiplexed and non-time-domain orthogonal cover codes.

5. The method according to claim 1, wherein sending the index to the terminal through the downlink control information comprises:
sending the index and indication information to the terminal through the downlink control information, wherein the indication information is configured to indicate a TRP type of a TRP corresponding to the index, and the TRP type is single-point transmission or multi-point transmission.

6. The method according to claim 1, wherein the index comprises a first-level index and a second-level index corresponding to the first-level index;
the first-level index is an index associated with the total number of ports in the DMRS configuration table;
the second-level index is an index associated with a port number in the DMRS configuration table.

7. The method according to claim 1, wherein sending the index to the terminal through the downlink control information comprises:
encapsulating the index in a preset field of the downlink control information, and sending the index to the terminal through the downlink control information; or
adding a preset field for the index in the downlink control information, and sending the index to the terminal through the downlink control information.

8. The method according to claim 1, wherein sending the index to the terminal through the downlink control information, comprises:
encapsulating, in a preset field of the downlink control information, the index in a preset character format, and sending the index to the terminal through the downlink control information.

9. A base station, comprising:
a first storage, a first processor, and a computer program stored on the first storage and executable by the first processor; wherein when the first processor executes the program, the first processor implements the method according to claim 1.

10. A method of receiving control information, the method being applied to a terminal and comprising:
acquiring an index, carried in downlink control information, of Demodulation Reference Signal (DMRS) configuration information for a physical downlink shared channel in a preset DMRS configuration table; and
searching DMRS configuration information, indicated by the index, in the DMRS configuration table,
wherein the index is acquired by a base station from the preset DMRS configuration table,
the index corresponding to the DMRS configuration information that meets a configuration condition of the terminal, wherein the DMRS configuration information comprises the total number of ports and total port numbers and the configuration condition comprises the number of Transmission Reception Points (TRP) currently supported by the terminal and the number of ports supported by each TRP.

11. The method according to claim 10, wherein searching the DMRS configuration information, indicated by the index, in the DMRS configuration table comprises:
determining a Transmission Reception Point (TRP) type of a TRP corresponding to the index, wherein the TRP type comprises single-point transmission and multi-point transmission; and
searching, in the preset DMRS configuration table, the DMRS configuration information indicated by the index under the TRP type of the TRP corresponding to the index.

12. The method according to claim 11, wherein, searching, in the preset DMRS configuration table, the DMRS configuration information indicated by the index under the TRP type of the TRP corresponding to the index comprises:

in a case that the TRP type of the index is the single-point transmission, searching, in the preset DMRS configuration table, the number of ports and port numbers corresponding to the TRP of the single-point transmission indicated by the index under the type of the single-point transmission.

13. The method according to claim 11, wherein searching, in the preset DMRS configuration table, the DMRS configuration information indicated by the index under the TRP type of the TRP corresponding to the index comprises:

in a case that the TRP type is the multi-point transmission, searching, in the preset DMRS configuration table, the number of TRPs of the multi-point transmission indicated by the index and the number of ports supported by each TRP under the type of the multi-point transmission.

14. The method according to claim 13, wherein , the DMRS configuration table further comprises port numbers and the number of ports allocated for each TRP; wherein any two of the port numbers of different TRPs are non-code-division multiplexed and non-time domain orthogonal cover codes.

15. The method according to claim 11, wherein determining a TRP type of a TRP corresponding to the index, comprises:

determining the TRP type of the TRP corresponding to the index based on indication information carried in the downlink control information and used for indicating the TRP type of the TRP corresponding to the index; or determining the TRP type of the TRP corresponding to the index based on Quasi Co-Location information carried in the downlink control information.

16. The method according to claim 10, wherein the index comprises a first-level index and a second-level index corresponding to the first-level index;

the first-level index is an index associated with the total number of ports in the DMRS configuration table;

the second-level index is an index associated with port numbers in the DMRS configuration table.

17. The method according to claim 10, wherein acquiring the index, carried in the downlink control information, of DMRS configuration information for the physical downlink shared channel in the preset DMRS configuration table comprises:

acquiring, from a preset field in the downlink control information, the index of the DMRS configuration information for the physical downlink shared channel in the preset DMRS configuration table; or acquiring bytes added with a preset field in the downlink control information, wherein the bytes added with the preset field are the index of the DMRS configuration information for the physical downlink shared channel in the preset DMRS configuration table.

18. The method according to claim 10, wherein acquiring the index, carried in the downlink control information, of the DMRS configuration information for the physical downlink shared channel in the preset DMRS configuration table comprises:

acquiring a field having a preset character format from a preset field in the downlink control information, wherein the field having the preset character format is the index of the DMRS configuration information for the physical downlink shared channel in the preset DMRS configuration table.

19. A terminal, comprising:

a second storage, a second processor, and a computer program stored on the second storage and executable by the second processor; wherein when the second processor executes the program, the second processor implements the method according to claim 10.

* * * * *